United States Patent
Simon et al.

(10) Patent No.: US 10,769,165 B2
(45) Date of Patent: Sep. 8, 2020

(54) COMPUTING DATA LINEAGE ACROSS A NETWORK OF HETEROGENEOUS SYSTEMS

(71) Applicant: SAP SE, Walldorf (DE)

(72) Inventors: Eric Simon, Levallois-Perret (FR); Francois Llirbat, Levallois-Perret (FR)

(73) Assignee: SAP SE, Walldorf (DE)

( * ) Notice: Subject to any disclaimer, the term of this patent is extended or adjusted under 35 U.S.C. 154(b) by 322 days.

(21) Appl. No.: 15/849,087

(22) Filed: Dec. 20, 2017

(65) Prior Publication Data
US 2019/0188308 A1    Jun. 20, 2019

(51) Int. Cl.
| | |
|---|---|
| *G06F 16/25* | (2019.01) |
| *G06Q 10/06* | (2012.01) |
| *G06F 21/62* | (2013.01) |
| *G06F 16/21* | (2019.01) |
| *G06F 16/901* | (2019.01) |

(52) U.S. Cl.
CPC .......... *G06F 16/254* (2019.01); *G06F 16/211* (2019.01); *G06F 16/219* (2019.01); *G06F 16/25* (2019.01); *G06F 16/256* (2019.01); *G06F 16/9024* (2019.01); *G06F 21/6236* (2013.01); *G06Q 10/063* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,319,945 | B1* | 1/2008 | Shapiro | G16B 5/00 703/11 |
| 2009/0292482 | A1* | 11/2009 | Frumkin | G16B 20/00 702/20 |
| 2012/0331008 | A1* | 12/2012 | Parida | G06F 16/9024 707/798 |
| 2013/0332423 | A1* | 12/2013 | Puri | G06F 16/219 707/687 |
| 2014/0279979 | A1* | 9/2014 | Yost | G06F 16/904 707/695 |
| 2017/0033971 | A1* | 2/2017 | Radivojevic | H04L 41/0213 |

(Continued)

OTHER PUBLICATIONS

Copyright 2016 SAP SE or an SAP affiliate company SAP SE; SAP HANA Developer Guide for SAP HANA Studio Document Version: 1.0—Nov. 30, 2016; pp. 165-167 (https://help.sap.com/doc/Production/fbb802faa34440b39a5b6e3814c6d3b5/2.0.00/en-US/SAP_HANA_Developer_Guide_for_SAP_HANA_Studio_en.pdf).

(Continued)

*Primary Examiner* — Shyue Jiunn Hwa
(74) *Attorney, Agent, or Firm* — Buckley, Msachoff & Talwalkar LLC

(57) ABSTRACT

Lineage graphs corresponding to data objects are generated. A data object of the data objects is associated with a source dataset table stored at a data lineage server (DLS). The source dataset table includes data of the data object received from a dataset stored at a data source system (DSS). A lineage graph corresponding to the dataset is determined from the lineage graphs. Based on the lineage graph, one or more data lineage structures are provided. The one or more data lineage structures include data from the dataset and from one or more datasets related to the dataset, and define lineage relationships between the data object and one or more data objects corresponding to the one or more datasets.

20 Claims, 19 Drawing Sheets

(56) References Cited

U.S. PATENT DOCUMENTS

2018/0075163 A1* 3/2018 Park .................. G06F 16/24532
2018/0144067 A1* 5/2018 Chatelain .................. G06F 7/02

OTHER PUBLICATIONS

Copyright 2017 Microsoft; How to: Navigate Between Scripts; retrieved online on Dec. 19, 2017; 1 page (https://msdn.microsoft.com/en-us/library/hh272691(v=vs.103).aspx).
Copyright 2017 Microsoft; How to: Use Rename and Refactoring to Make Changes to your Database Objects; retrieved online on Dec. 19, 2017; 3 pages; (https://msdn.microsoft.com/en-us/library/hh272704(v=vs.103).aspx).
Copyright 2016 Denodo Technologies, Inc.; Denodo Virtual Dataport 6.0 Advanced VQL Guide; p. 87 (https://community.denodo.com/docs/html/browse/6.0/vdp/vql/stored_procedures/predefined_stored_procedures/clean_cache_database).
Copyright 2016 Denodo Technologies, Inc.; Denodo Virtual Dataport 6.0 Advanced VQL Guide; Transactions in Virtual Dataport; p. 72; (https://community.denodo.com/docs/html/browse/6.0/vdp/vql/transactions_in_virtual_dataport/transactions_in_virtual_dataport).
InfoSphere Information Server (https://www.ibm.com/analytics/information-server); retrieved online on Dec. 19, 2017; 8 pages (https://www.ibm.com/analytics/information-server).
Hayden Marchant; Exploring data lineage: Get a complete picture of your data flows; published online Jan. 7, 2010; 15 pages (https://www.ibm.com/developerworks/data/library/techarticle/dm-1001datalineageinfosphereworkbench/).
Copyright (c) 1993-2016 Informatica LLC.; Informatica Metadata Manager User Guide; Chapter 6; Working with Data Lineage; pp. 58-72 (https://kb.informatica.com/proddocs/Product%20Documentation/5/MM_101_MetadataManagerUserGuide_en.pdf).
Copyright 2017 Cloudera, Inc.; Cloudera Navigator Lineage Diagrams, retrieved online on Dec. 19, 2017; 11 pages (https://www.cloudera.com/documentation/enterprise/5-7-x/topics/cn_iu_lineage.html).
Werner Schuetz; Integrating heterogeneous metadata; published online Jul. 23, 2009; 26 pages (https://www.ibm.com/developerworks/data/library/techarticle/dm-0907metadataintegration/index.html).
Copyright 2012-2017; Hortonworks, Inc. Data Governance; 14 pages (https://docs.hortonworks.com/HDPDocuments/HDP2/HDP-2.6.2/bk_data-governance/content/atlas_lineage_api.html).
"Communication: Extended European Search Report", dated Feb. 14, 2019 (Feb. 14, 2019), European Patent Office for European Patent Application No. 18209401.1-1217, 10pgs.
Anonymous: "SAP Information Steward Administrator Guide", Document Version: 4.2 Support Package 7 Patch 1 (14.2.7.1) Jan. 24, 2017 (Jan. 24, 2017), XP055548898, Retrieved from URL:https://help.sap.com/http.svc/rc/93011d69406b43680d1da7b61ae1c6f/4.2.7/en-US/is_42_admin_en.pdf, [retrieved on Jan. 29, 2019], 310pgs.
Anonymous: "SAP Information Steward User Guide, Chapter 3", Document Version: 4.2 Support Package 8 (14.2.8.0) May 4, 2017 (May 4, 2017), XP055549023, Retrieved from URL:https://help.sap.com/doc/PRODUCTION/18ec99b2d06649c5b8b79c784d5a3af9/4.2.8/en-US/is_42_user_en_pdf, [retrieved on Jan. 29, 2019], 145pgs.

* cited by examiner

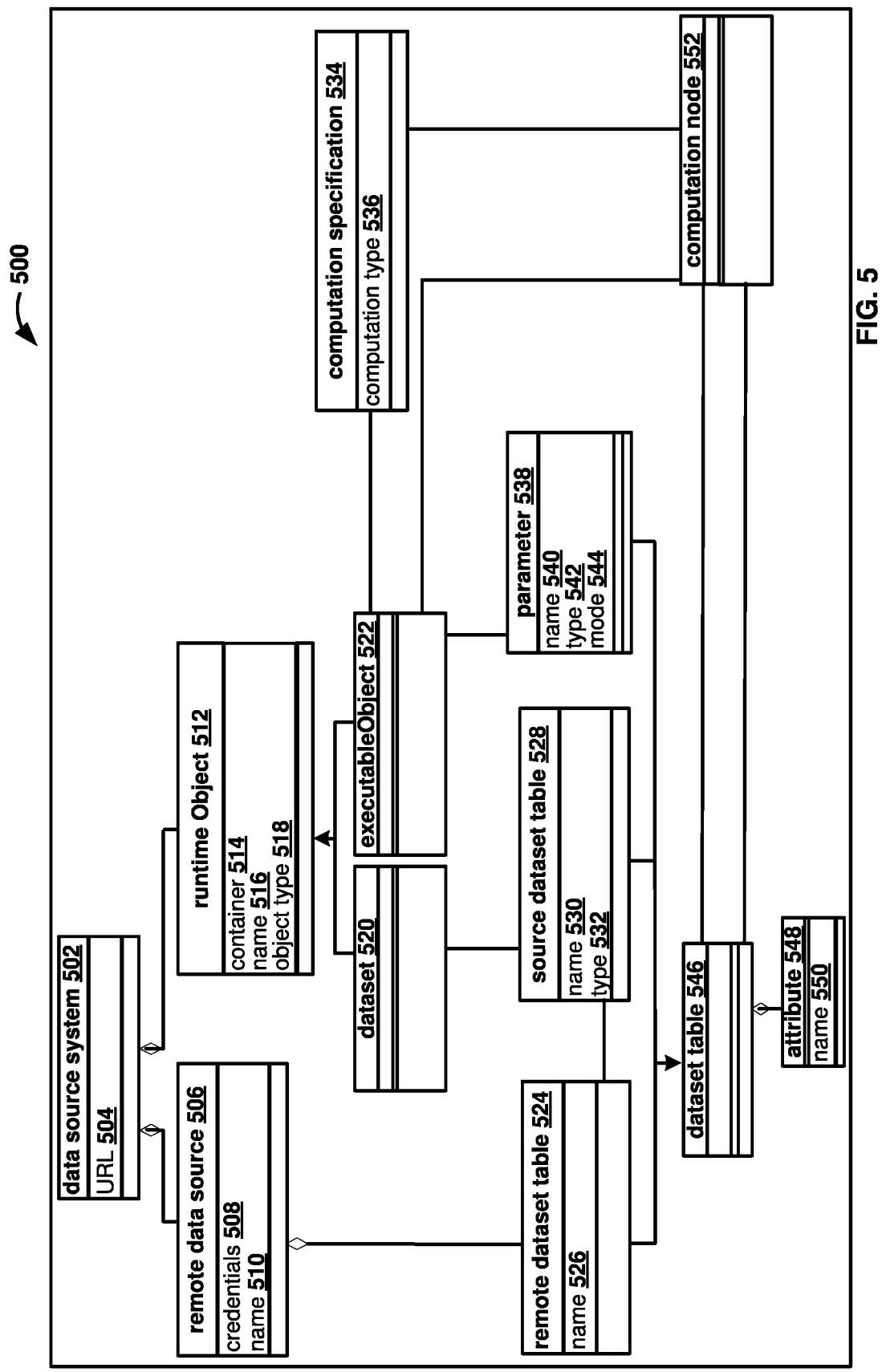

XML FILE 1210

```
<Sales xmln:xsi="http://www.w3.org/2011/XMLSchema-instance"xsi:noNamespaceSchema
Location="C:\Users\1051496\sales.xsd">
  <Store storeRef="ST1" storeName="myShop" storeType="large" city="NY" country="US"
    state="NY">
    <Sale date = "2002-09-24" productReference="Prod1" quantity="3" unitPrice="5.50"/>
    <Sale date = "2002-09-24" productReference="Prod1" quantity="3" unitPrice="5.50"/>
    <Sale date = "2002-09-24" productReference="Prod1" quantity="3" unitPrice="5.50"/>
  </Store>
  <Store storeRef = "ST2" storeName="yourShop" storeType="small" city="NY" country="US"
    state="NY">
    <Sale date = "2002-09-24" productReference="Prod1" quantity="3" unitPrice="5.50"/>
    <Sale date = "2002-09-24" productReference="Prod5" quantity="3" unitPrice="6"/>
    <Sale date = "2002-09-24" productReference="Prod5" quantity="8" unitPrice="6"/>
  </Store>
</Sales>
```

| STORE 1220 | | | | | | |
|---|---|---|---|---|---|---|
| storeRef 1222 | storeName 1224 | storeType 1226 | State 1228 | Zip 1230 | City 1232 | Country 1234 |
| ST1 | myShop | Large | NY | Null | NY | US |
| ST2 | yourShop | Small | NY | Null | NY | US |

| SALE 1240 | | | | |
|---|---|---|---|---|
| storeRef 1242 | unitPrice 1244 | productReference 1246 | Date 1248 | Quantity 1252 |
| ST1 | 5.50 | Prod1 | 2002-09-24 | 3 |
| ST1 | 5.50 | Prod1 | 2002-09-24 | 3 |
| ST1 | 5.50 | Prod1 | 2002-09-24 | 3 |
| ST2 | 5.50 | Prod1 | 2002-09-24 | 3 |
| ST2 | 6.00 | Prod5 | 2002-09-24 | 3 |
| ST2 | 6.00 | Prod5 | 2002-09-24 | 8 |

FIG. 12

```
1. CREATE VIEW "S"."S7" as
2. SELECT
3.     "S10"."A" as A,
4.     "ST1"."B" + "S10"."B" as B,
5.     SUM ("ST1"."C") as M
6. FROM
7.     "S"."S10" as ST1
8.     LEFT OUTER JOIN
9.     (SELECT
10.         "S4"."A" as A
11.        "S4"."B" as B,
12.        MAX ("S20"."C") as C
13.    FROM
14.        "S"."S20" as S20 INNER JOIN "S"."S24" as S4 ON "S20"."FK" = "S4"."K"
15.    GROUP BY S4.B, S4.A
16.    ) as ST1
17.    ON "ST1"."A" = "S10"."A"
18. WHERE
19.    "S10"."C" IN
20.        (SELECT MAX ("S3"."B") AS B
21.        FROM "S"."S3" as S3
22.        WHERE "S3"."A" = "S10"."A"
23.        ) as ST2
24. GROUP BY "S10"."A", ST1"."B" + "S10"."B"
```

COMPUTING DATA LINEAGE ACROSS A NETWORK OF HETEROGENEOUS SYSTEMS

BACKGROUND

Data lineage information describes origins and history of data. More specifically, the data lineage information describes data life cycle stages including creation, transformation, and processing of data. Data may be represented in multiple ways, ranging from files to analytic datasets, key performance indicators (KPIs), and dashboards. Data management tasks such as data modeling, data administration, data integration, etc. rely on the data lineage information. The data lineage information is also valuable for big data projects as organizations increasingly adopt big data infrastructures such as Amazon S3® or Apache Hadoop® to store various types of datasets (logs, receipts, feeds, etc.). The organizations also utilize Apache Hadoop® as a development infrastructure for building software information, where raw datasets are transformed and combined into aggregated data. The data provided through Amazon S3® or Apache Hadoop® data pipelines may be loaded into business intelligence (BI) infrastructures. However, it is becoming more difficult to understand, manage and govern large amounts of data created for the big data projects. For example, conforming to government regulations and data policies becomes increasingly important for various industries. Since lack of data control constitutes a foundation level of data infrastructures of many industries, auditing and conformance to data management regulations are further complicated.

Two main use cases of data lineage are impact and lineage analysis. For example, an impact analysis across connected systems is required when developers perform maintenance operations. Changing organization of a dataset to meet requirements of an application or changing definition of a computation specification that describes data transformations may require understanding of the impact such changes may have on associated computation specifications and datasets, possibly located at the connected systems. Conversely, when accessing the dataset, a user may request original datasets from which the dataset was produced and the successive chain of data transformations that were applied possibly across the connected systems to produce the dataset. In this case, a lineage analysis of the dataset across the connected systems is required. Thus, the growing amount of data that forms common data landscape of an organization, including both enterprise data and big data lakes, and the continuous trend of empowering users such as analysts and data scientists to access and prepare the data, has increased the necessity for lineage and impact analysis across networks of connected heterogeneous systems.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 5 is a unified modelling language (UML) class diagram illustrating a dataset level lineage model, according to one embodiment.

FIG. 12 is an exemplary dataset represented as a number of tables, according to one embodiment.

FIG. 13 illustrates an exemplary computation specification, according to one embodiment.

DETAILED DESCRIPTION

Embodiments of techniques for computing data lineage across a network of heterogeneous systems are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

A data lineage service provides data lineage and data impact analysis across a network of heterogeneous systems. The data lineage service is running on a data lineage server (DLS). The data lineage service creates table-based representations of heterogeneous datasets. Additionally, the data lineage service transforms lineage information in accordance with a data lineage metadata model that defines a unified representation of data manipulations. Based on the data lineage metadata model, the data lineage service translates heterogeneous computation specifications into data structures. The data lineage service provides data lineage information with varying granularity, including dataset level and attribute level lineage information.

Figure 1:
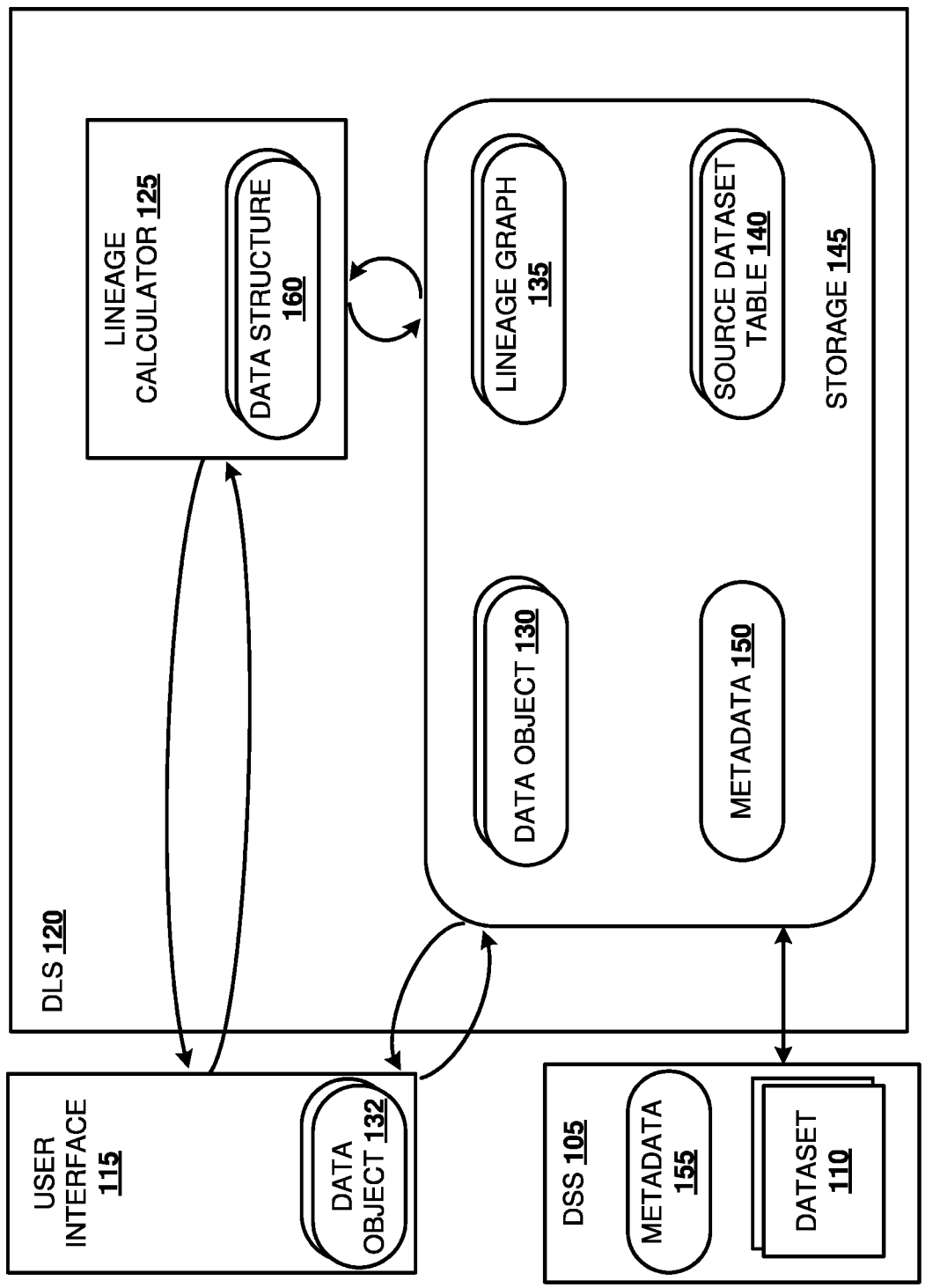
FIG. 1 is a block diagram illustrating a system to provide data lineage information for data objects, according to one embodiment.

FIG. 1 illustrates a system 100 to provide data lineage information, according to one embodiment. The system 100 includes user interface (UI) 115, data source system (DSS) 105, and DLS 120. The DSS 105 is a system where data may be stored and manipulated. Examples of data source systems (DSSs) include file systems, database systems, data repositories, etc. Further, DSSs may provide functionality to systems that compute datasets on-demand, for example via executing queries over the stored data or via dynamic invocation of programs manipulating the data. The DSSs also include data platforms such as Web services, analytics applications, Business Intelligence (BI) platforms, etc. The DSS 105 may be accessed at a network location defined by a uniform resource locator (URL).

In one embodiment, the DSS 105 includes metadata 155 and a number of datasets such as dataset 110. The dataset 110 is a named collection of organized individual data elements (or data items) that may be manipulated as a unit by a computer program. Examples of datasets include, but are not limited to, a table with columns and rows (a database table), a comma-separated values (CSV) file, a data matrix of dimension "n" by "p" in multivariate statistics, where "n" is the number of samples observed, and "p" is the number of variables (features) measured in samples, etc. Moreover, datasets may be files containing sensor data, graphs, time series, images, files with nested structures like Extensible Markup Language (XML) files, multi-dimensional data cubes, etc.

In one embodiment, the metadata 155 include metadata for the number of datasets stored at the DSS 105. The metadata 155 also include metadata for the dataset 110. Metadata of a dataset include computation specifications associated with the dataset and references to parent and child datasets. Computation specifications may include parent and child datasets from the DSS 105 and/or from other DSSs. The computation specifications describe how the dataset is computed from the parent datasets and how the child datasets are computed from the dataset. For example, a computation specification may be a database procedure or a script program.

In one embodiment, the DLS 120 provides data lineage information to client computer programs such as the UI 115. The client computer programs include, but are not limited to, web browsers, voice browsers, application clients, and other software that may access, consume and display content. In one embodiment, the UI 115 is running on a UI device (not illustrated). The UI device may access the DLS 120 remotely. It should be appreciated, however, that the UI 115 may be a computer program running on the DLS 120. In one embodiment, the UI 115 includes one or more data objects such as data object 132. The data object 132 is provided for displaying to the UI 115 by the DLS 120. The data object 132 is a copy of data object 130 that is stored at the DLS 120.

In one embodiment, the DLS 120 includes lineage calculator 125 and storage 145. Through the data lineage calculator 125 and the storage 145, the DLS 120 provides a data lineage service that calculates data lineage information for data objects. The storage 145 includes metadata 150 and a number of source dataset tables such as source dataset table 140. The source dataset table 140 is a table-based representation of the dataset 110 within the DLS 120. The source dataset table 140 references the dataset 110 that is stored at the DSS 105. The source dataset table is created by translating the dataset 110 into one or more tables such as the source dataset table 140. In one embodiment, the metadata 155 are extracted from the DSS 105 and stored at the storage 145 as the metadata 150. The storage 145 also includes a number of data objects such as the data object 130. The data object 130 is associated with the source dataset table 140. The data object 130 represents the source dataset table 140 on the UI 115. The data object 130 can be viewed as a proxy to data stored in the source dataset datable 140. That is, the data object 130 may include a portion of the data stored in the source dataset table 140. In addition, the storage 145 includes a number of lineage graphs generated for the number of data objects. For example, lineage graph 135 is generated for the data object 130. The lineage graph 135 describes lineage relationships between the dataset 110 that corresponds to the data object 130 and one or more parent and child datasets of the dataset 110.

In one embodiment, the lineage calculator 125 is in communication with the storage 145 and the UI 115. The lineage calculator 125 receives requests to provide lineage information. For example, the lineage calculator 125 may receive a request to provide lineage information for the data object 132 that is displayed on the UI 115. The data object 132 may be presented on the UI 115 either with granularity of a dataset or with a granularity of attributes of the dataset. The lineage calculator 125 responds to the requests by calculating the lineage information and generating data structures based on contents of the storage 145. For example, the lineage calculator 125 may receive the request to provide lineage information for the data object 132 (or for one or more attributes of the data object 132) and search in the metadata 150 for metadata associated with the data object 132. Based on the metadata, the lineage calculator determines that the data object 132 is a copy of the data object 130 that is stored at the storage 145. The data object 132 may be based on one or more data objects stored at the storage 145. The one or more data objects may be combined to generate the data object 132 presented on the UI 115. Also, the lineage calculator 125 determines that the data object 130 is associated with the source dataset table 140 and with the dataset 110 that is stored at the DSS 105.

In one embodiment, the lineage calculator 125 generates data structure 160 based on the lineage graph 135 and the source dataset table 140. The data structure 160 is created in response to the request to provide lineage information. The data structure 160 provides lineage information for relations between the data object 130 and one or more other data objects at the storage 145. The data objects are associated with parent and child datasets of the dataset 110. Like the data object 130, the data objects may include portions of data stored in corresponding source dataset tables. In one embodiment, the lineage calculator 125 provides the data structure 160 for displaying and analysis. For example, the lineage calculator 125 may render the data structure 160 on the UI 115. Alternatively, the data structure 160 may be provided for rendering on various graphical user interfaces (GUIs) (not illustrated) connected to the DLS 120.

Figure 2:
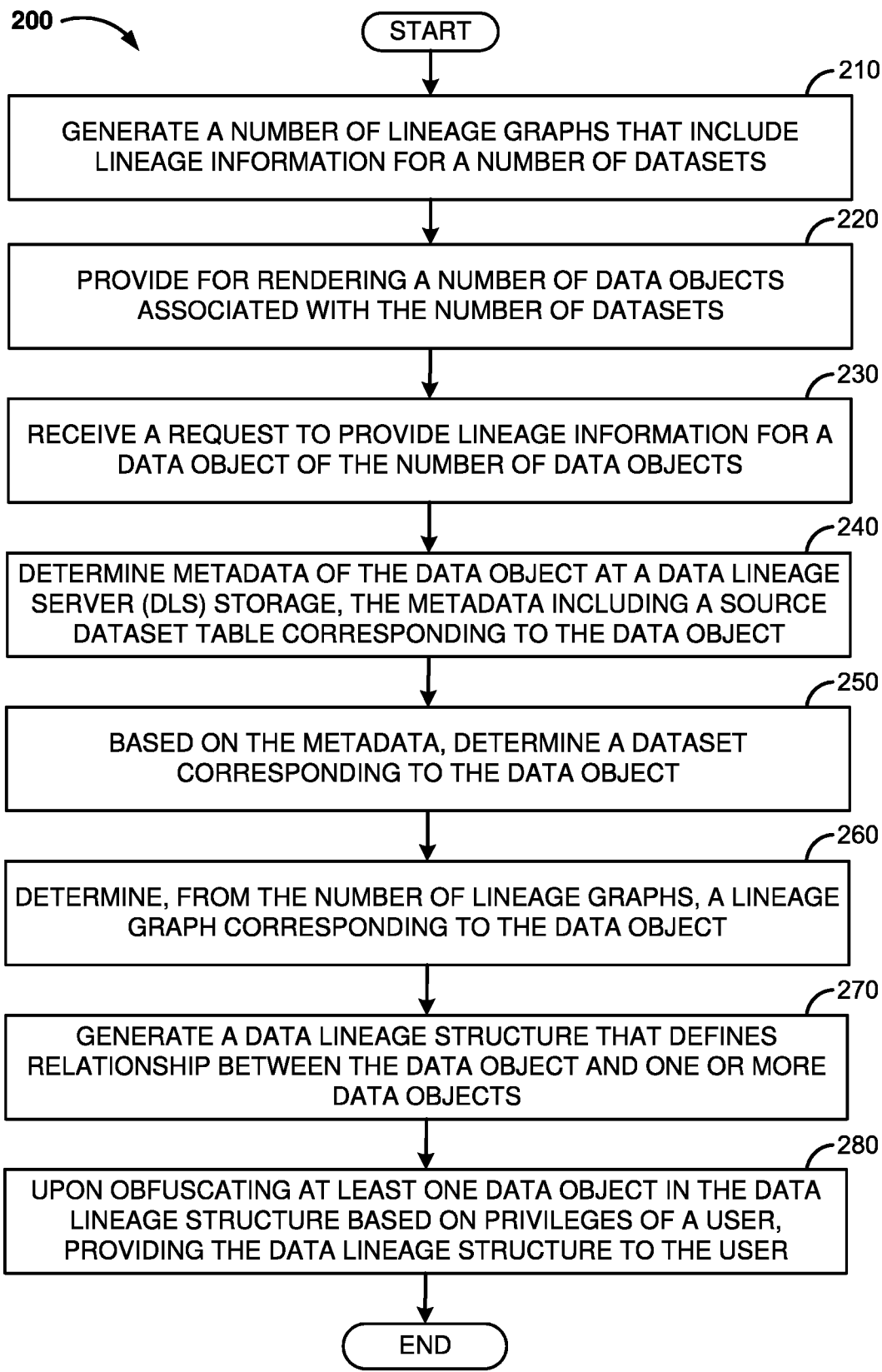
FIG. 2 is a flow diagram illustrating a process to provide data lineage information for a data object, according to one embodiment.

FIG. 2 illustrates a process 200 to provide data lineage information for a data object, according to one embodiment. At 210, a number of lineage graphs is generated. For example, the lineage graphs are generated at a DLS. The DLS is connected to a number of DSSs. The lineage graphs include lineage information for datasets stored at the DSSs. One or more lineage graphs may be generated for a dataset. For example, a lineage graph with a dataset level granularity and a lineage graph with an attribute level granularity may be generated for the same dataset. In one embodiment, the DLS extracts the lineage information from the DSSs via one or more lineage extractors running on the DLS. The lineage extractors are configured to continuously access the DSSs and return data and lineage information for the datasets. The lineage extractors may be configured in a pull mode and may, therefore, access the DSSs to pull the lineage information. Alternatively, the lineage information may be pushed to the lineage extractors by the DSSs. The lineage extractors connect to the DSSs through connections with various credentials. The lineage extractors may access the data and the lineage information at the DSSs based on privileges defined by the credentials of the connections. At 220, a number of data objects is provided for rendering. The data objects are associated with the datasets. One or more data objects may be associated with a dataset. The data objects may be created for the datasets during extraction of the lineage information from the DSSs.

At 230, a request to provide lineage information for a data object is received at the DLS. For example, the request may be triggered upon receiving a selection input including the data object from a user. The selection input may be with dataset level granularity or with attribute level granularity. In one embodiment, the DLS storage stores metadata for the data objects. The metadata define correspondence between data objects and datasets. At 240, metadata of the data object are determined. The metadata of the data object include corresponding dataset, source dataset table, lineage graph, parent and child datasets of the corresponding dataset, etc. At 250, a dataset corresponding to the data object is determined within the DLS storage. In addition, the DLS storage may store a number of other source dataset tables associated with the data objects.

At 260, a lineage graph corresponding to the data object is determined from the generated lineage graphs. Since the lineage graphs are generated for datasets, the lineage graph is determined to correspond to the data object based on the dataset associated with the data object. In one embodiment, the lineage graphs are generated when the lineage information, that is extracted from the DSSs, is loaded into the DLS storage. At 270, a data lineage structure is generated based on the data lineage graph. The data lineage structure provides information for the relation between the data object and data objects associated with the parent and child datasets. Optionally, the data lineage structure may be annotated with summary information. The summary information may include, for a node of the lineage structure that is not a table computation node, a description of how values of attributes of the node affect values of attributes of a descendent node, how the values of the attributes of the node are affected by values of attributes of an ascendant node, and types of computations applied to the attributes of the ascendant node and to the attributes of the node. The summary information may be computed when the computation node graph is loaded into the DLS storage. Further, the data lineage structure includes data from source dataset tables corresponding to the data object and the data objects. An exemplary data lineage structure will be described below with reference to FIG. 11.

At 280, the data lineage structure is provided to the user. In one embodiment, user privileges are examined when the lineage structure is created and, if it is determined that the user is not authorized to access one or more data objects from the lineage structure, the one or more data objects may be obfuscated before providing the lineage structure to the user.

Figure 3:
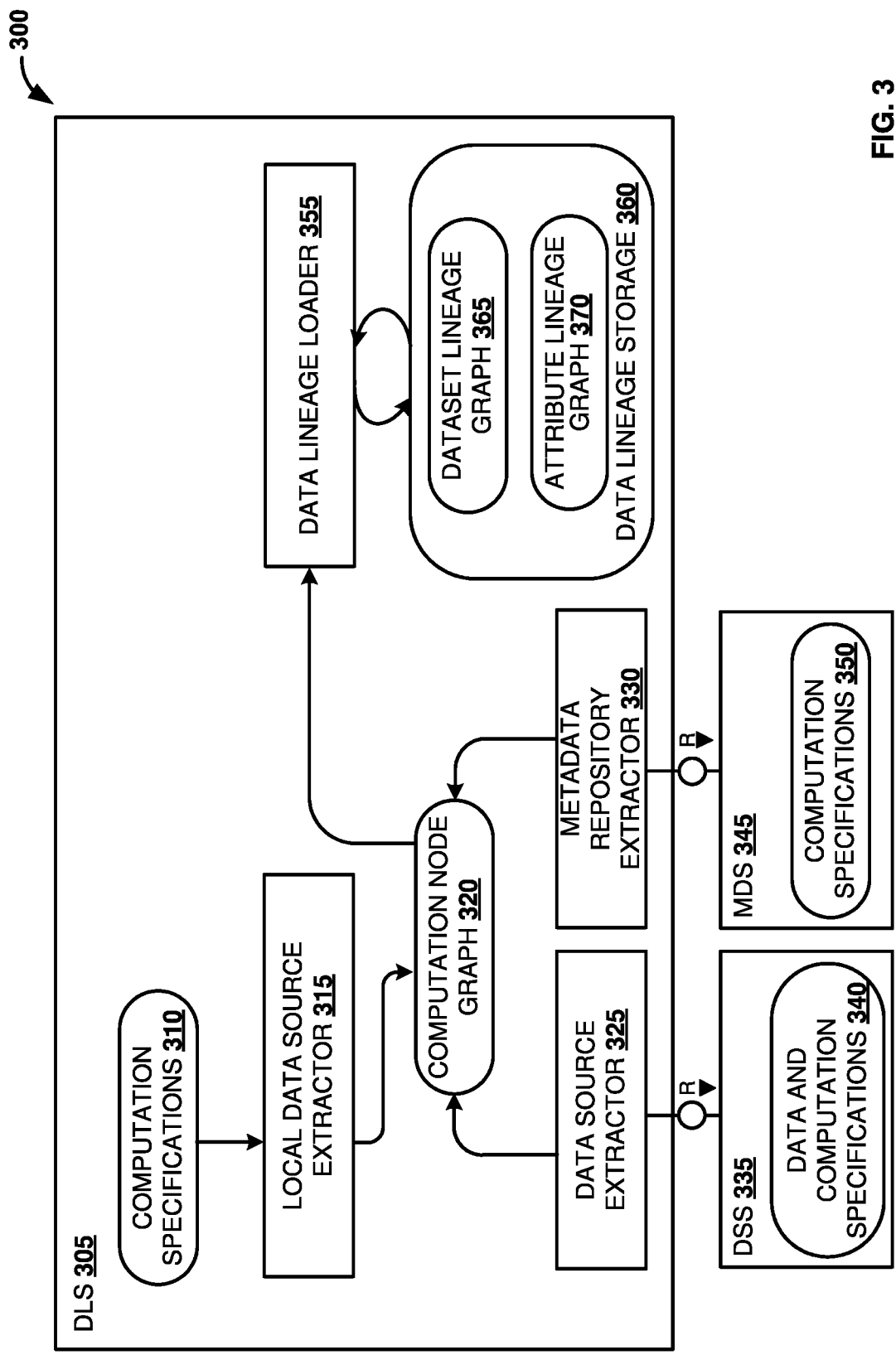
FIG. 3 is a block diagram illustrating a system to extract data lineage information from heterogeneous systems, according to one embodiment.

FIG. 3 illustrates a system 300 to extract data lineage information from heterogeneous systems, according to one embodiment. The system 300 includes DLS 305. In one embodiment, the DLS 305 is similar to the DLS 120, described above with reference to FIG. 1. The DLS 305 is in communication with DSS 335 and/or metadata repository system (MDS) 345, and extracts data lineage information from the DSS 335 and the MDS 345. The MDS 345 is a system that offers data computation services to produce datasets persisted in another system. Examples of the MDS 345 include "extract, transform, load" (ETL) systems, "extract, load, transform" (ELT) systems, etc. The MDS 345 may be located on a server. The MDS 345 reads datasets from one data source system, performs local transformations, stores intermediate and temporary calculations on the server, and creates output datasets to be persisted in another data source system. The MDS 345 does not provide an access to datasets. However, the MDS 345 includes specification of data transformations that produce datasets. Computation specifications of datasets may be extracted from the MDS 345, while the datasets are accessible from a data source system.

In one embodiment, the DLS 305 includes local data source extractor 315, data source extractor 325, and metadata repository extractor 330. The local data source extractor 315 extracts lineage information from computation specifications 310 that are internal for the DLS 305. For example, the local data source extractor 315 may extract lineage information from federated queries or other computation types that are executed at the DLS 305. The data source extractor 325 and the metadata repository extractor 330 periodically connect to the DSS 335 and the MDS 345, respectively. The data source extractor 325 extracts lineage information from data and computation specifications 340 stored at the DSS 335. The metadata repository extractor iteratively extracts lineage information from computation specifications 350 stored at the MDS 345.

In one embodiment, the local data source extractor 315, the data source extractor 325, and the metadata repository extractor 330 are configured to extract computation specifications in the form of computation node graph 320. For example, the extractors may be configured via an administration tool (not illustrated). The configuration may identify data source and metadata repository systems to be accessed for extraction of lineage information. In addition, configuration of the extractors may include provision of credentials for creating a metadata connection, specifying types of data and computation specifications for which extraction of data lineage information is required, and specifying time schedule to determine how often the extraction to be performed.

In one embodiment, the computation node graph 320 is a data structure that describes relationships between datasets and transformation operations applied on datasets to calculate child datasets. The computation node graph 320 includes nodes that represent datasets or transformation operations, and edges that interconnect the nodes. The extractors create the computation node graph 320 based on a unified metadata model for generation of computation node graphs. The metadata model for creation of computation node graphs will be described in detail below, with reference to FIG. 5 and FIG. 6.

In one embodiment, the computation node graph 320 is loaded in data lineage storage 360 through the data lineage loader 355. The data lineage storage 360 stores a number of lineage graphs associated with datasets. In addition, the data lineage storage 360 includes metadata for source dataset tables that are associated with datasets and store data from the datasets.

In one embodiment, the data lineage loader 355 processes the computation node graph 320. Based on the computation node graph 320, the data lineage loader 355 creates dataset lineage graph 365 and attribute lineage graph 370. The dataset lineage graph 365 is a data structure that describes lineage relationships on a dataset level. The dataset lineage graph 365 is created based on a metadata model that is described in details with reference to FIG. 7 below. The attribute lineage graph 370 is a data structure that describes lineage relationships between attributes of the datasets. The attribute lineage graph 370 is created based on a metadata model that is described in detail with reference to FIG. 8 below. Examples of generation of the dataset lineage graph 365 and the attribute lineage graph 370 will be described below, with reference to FIG. 15 and FIG. 16, respectively.

Figure 4A:
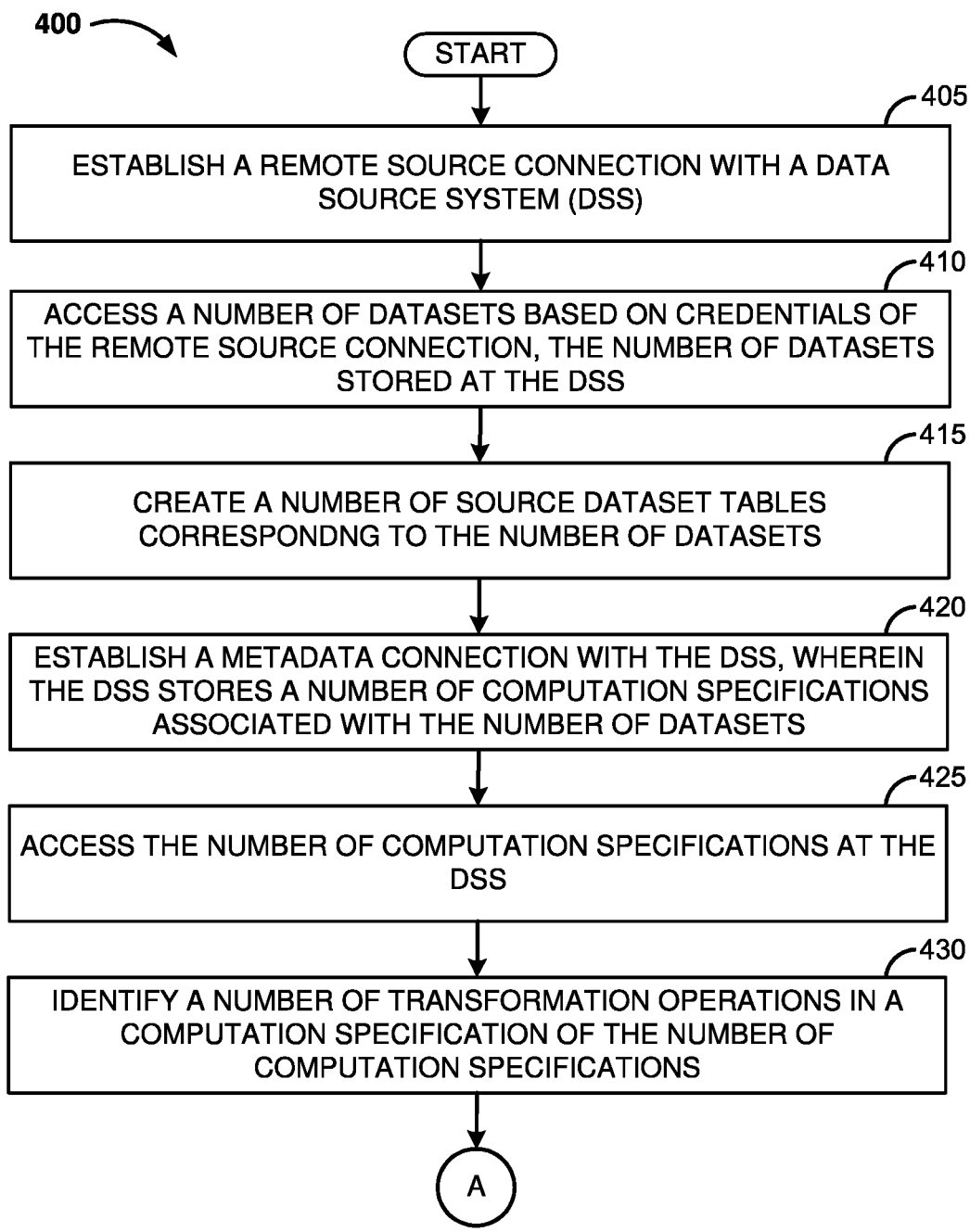
FIGS. 4A-4B are flow diagrams illustrating a process to generate an attribute lineage graph, according to one embodiment.
Figure 4B:
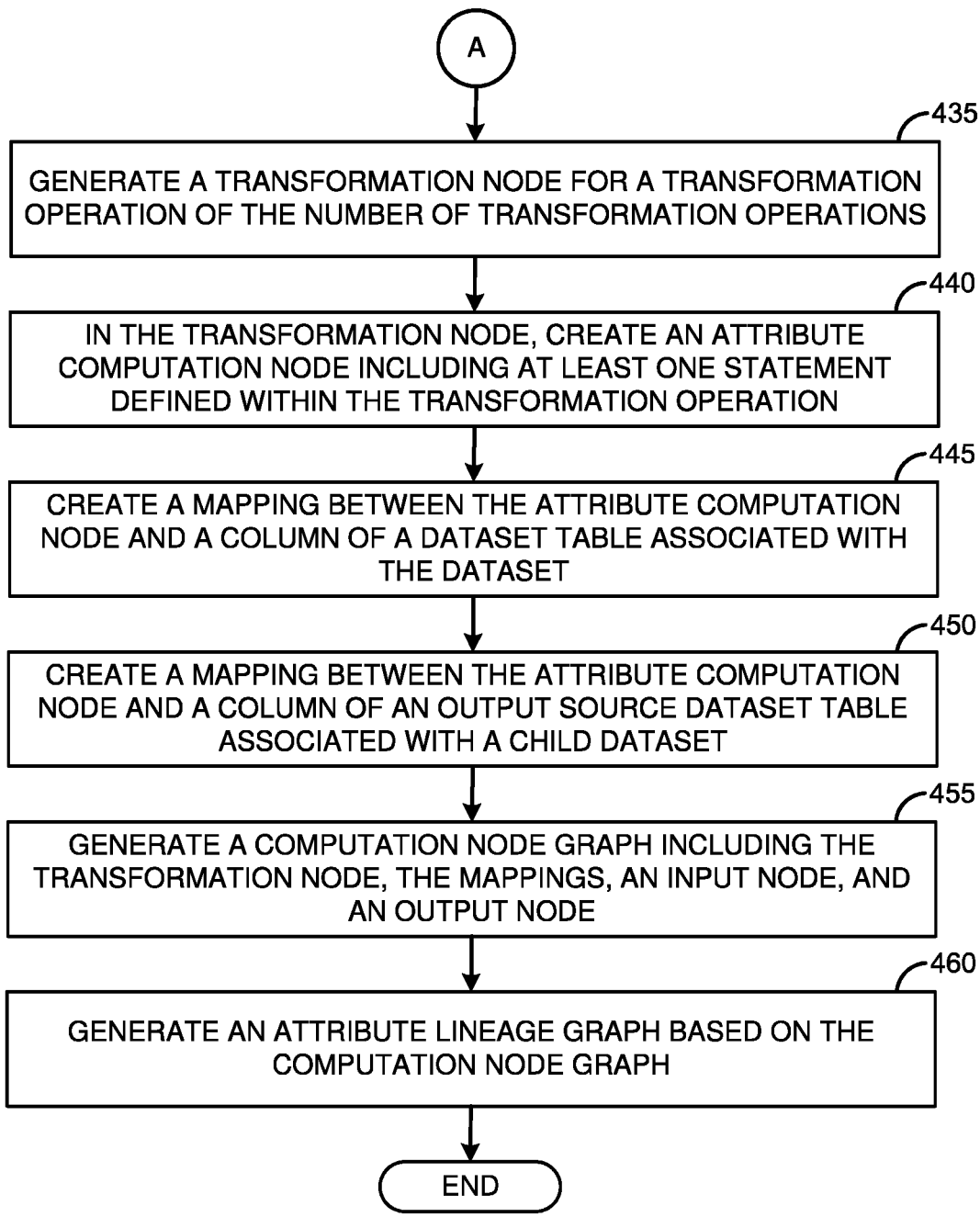

FIGS. 4A-B are flow diagrams illustrating a process 400 to generate an attribute lineage graph, according to one embodiment. At 405 (FIG. 4A), a remote source connection is established between a DLS and a DSS. For example, the remote source connection may be established between the DLS 305, FIG. 3, and the DSS 335, FIG. 3. The remote source connection is based on a set of credentials. The credentials may be pre-configured in the DLS by an administrator (e.g., through an administration tool that accesses an administration service of the DLS). In one embodiment, the administrator may also associate a set of credentials with a role of a user in the DLS. The association may define one or more connections accessible to a particular user based on the role of the user and the corresponding set of credentials. Based on the association, various additional security filters may be configured. The credentials may be assigned by the administrator to a data source extractor that establishes the remote source connection. For example, the data source extractor 325, FIG. 3, may establish the remote source connection. At 410, a number of datasets is accessed at the DSS. The datasets are accessed based on credentials of the remote source connection. For example, the credentials of the remote source connection may limit the data source extractor to access a subset of the datasets stored at the DSS, or a subset of attributes of the datasets stored at the DSS. Upon accessing the datasets, at 415, a number of source dataset tables is created. The source datasets tables correspond to the number of datasets. A dataset may be translated into one or more source dataset tables. The source dataset tables include data of the datasets.

In one embodiment, the DSS stores computation specifications associated with the datasets. A computation specification of a dataset includes one or more statements applied to attributes of the dataset to calculate one or more attributes of child datasets. The dataset may be associated with a number of computation specifications. For example, the dataset may be computed by one or more parent datasets based on a first computation specification, while the child datasets may be computed from the dataset based on a second computation specification. At 420, a metadata connection is established between the DLS and the DSS. The metadata connection may be created with different credentials than the remote source connection. At 425, the computation specifications are accessed. In one embodiment, access to the computation specifications may be restricted by the credentials of the metadata connection. Accordingly, the data source extractor may access one or more of the computation specifications depending on the credentials of the metadata connection. Upon access, at 430, a number of transformation operations is identified within a computation specification that is accessed. The transformation operations may be applied over one or more attributes of the dataset to generate the attributes of the child datasets.

At 435 (FIG. 4B), a transformation node is generated for a transformation operation identified within the computation specification. At 440, an attribute computation node is created in the transformation node. The attribute computation node includes at least one statement that is defined within the transformation operation. The statement may be applied on a specific attribute of the dataset to generate a corresponding attribute of the child dataset. In one embodiment, the transformation node includes a number of attribute computation nodes. At 445, a mapping is created between the attribute computation node and a column of a source dataset table associated with the attribute of the dataset. At 450, a mapping is created between the attribute computation node and a column of an output source dataset table associated with the child dataset.

At 455, a computation node graph for the dataset is generated. In one embodiment, the computation node graph includes an input node that represents the dataset, an output node that represents the child dataset, one or more transformation nodes that describe transformation operations applied on the dataset to generate the child dataset, and a number of edges that represent the generated mappings. Based on the computation node graph, at 460, an attribute lineage graph is generated. For example, the attribute lineage graph 370, FIG. 3, is generated based on the computation node graph 320, FIG. 3.

FIG. 5 is a UML class diagram 500 illustrating a dataset level lineage model, according to one embodiment. A UML class diagram graphically represents a static view of one or more aspects of a system. For example, the UML class diagram 500 is a graphical representation of a static view of a dataset level lineage model of the system 300, FIG. 3. The system 300 extracts dataset level lineage information from heterogeneous systems. Based on the dataset level lineage model, the system 300 may extract data lineage information in the form of a computation node graph such as the computation node graph 320, FIG. 3. The dataset level lineage model defines lineage data structures and dependencies between the data structures within the computation node graph 320. In one embodiment, the dataset level lineage model is based on dataset tables and computation nodes. The UML class diagram 500 includes dataset table 546. The dataset table 546 is a named collection of data items associated with a set of zero or more attributes such as attribute 548. The attribute 548 is identified by a property "name" 550 that has a unique value within the dataset table 546.

Computation node graphs extracted from various systems may include nodes that represent dataset tables of different types. A dataset table may be of type remote dataset table 524, source dataset table 528, or parameter 538. The source dataset table 528 is a table-based representation of a dataset 520. The dataset 520 may be represented by one or more source dataset tables such as the source dataset table 528. The source dataset table 528 has properties "name" 530 and "type" 532. The source dataset table 528 may be identified based on value of the property "name" 530. The value of the property "type" 532 is defined based on a corresponding data source system 502. For example, when a graph is considered as a dataset, the dataset may be represented by two tables, one table storing nodes and one table storing edges. For the first table, value of the property "type" 532 may be "GRAPH.NODES", while for the second table, value of the property "type" 532 may be "GRAPH.EDGES". The dataset 520 is a dataset within the data source system 502. Data of the dataset 520 may be queried or accessed from outside the data source system 502. The dataset 520 designates a runtime object 512 that is identified within the data source system 502 by a container 514 for the dataset 520, a property "name" 516 of the dataset 520 within the container, and a property "object type" 518 that depends on the type of data source system 502.

The remote dataset table 524 represents the source dataset table 528 in a remote data source 506 defined at the data source system 502. The remote dataset table 524 is associated with a dataset in the data source system 502. Associations between remote dataset tables and datasets are based on a mapping logic implemented by extractors of the DLS that connect to the DSSs and extract the lineage data. The source dataset table 528 may be represented by zero or one remote dataset tables such as the remote dataset table 524. The remote dataset table 524 may be also referred to as a remote data object. The remote dataset table 524 is identified by value of a property "name" 526, a container that identifies a remote data source 506 within the DLS, and a reference to the source dataset table 528 from which the remote dataset table 524 is obtained. In one embodiment, the remote dataset table 524 corresponds to a remote data source 506. A remote data source represents a remote source connection established between the DLS and the data source system 502. The remote data source 506 is a remote data connection to the data source system 502. The remote data source 506 is created by an extractor of the DLS. The remote data source 506 has properties "name" 510 and "credentials" 508. Value of the property "credentials" 508 defines one or more datasets within the data source system 502 that are accessible for the extractor of the DLS.

The parameter 538 is defined by a computation specification 534. The parameter 538 may be of type "table" or "scalar". A "table" parameter has multiple values and has a predefined set of attributes. A "scalar" parameter has one value. The "scalar" parameter is modeled as a dataset table with a single attribute and a single row. The parameter 538 has properties "name" 540, "type" 542, and "mode" 544. Value of the property "mode" 544 indicates whether the parameter is an input parameter or an output parameter. In one embodiment, the parameter 538 is a dataset table that represents an input or output parameter of an executable object 522. An executable object is a runtime object interpreted by an execution engine to produce one or more datasets from one or more datasets. For example, when the data source system 502 is a database system, the execution engine is a database engine.

The executable object 522 is defined by a computation specification 534. A computation specification is an authored specification of computation of derived datasets, which may either be directly interpreted as the executable object 522, or compiled into one or more executable objects 522. The computation specification 534 is described by a container specifying location of the computation specification 534 within the data source system 502 (e.g., a folder or package path) and a name of the computation specification 534 within the container. The computation specification 534 has a property "computation type" 536. Value of the property "computation type" 536 specifies type of the computation specification 534. For example, when the computation specification 534 is a database SQL query or a database procedure, value of the property "computation type" 534 may be set to "database SQL query" or "database procedure", respectively.

In one embodiment, data lineage information may be extracted from the computation specification 534. The extracted data lineage information is represented by a computation node 552. The computation node 552 describes relationship between a set of input datasets, and a set of output datasets into which data items have been inserted, updated, or deleted from, when the executable object 522, defined by the computation specification 534 executes. The computation node 552 refers to a single computation specification 534 from which the data lineage information is extracted. The computation specification 534 may be referred to as lineage owner of the computation node 552. In addition, the executable object 522 created by compiling or interpreting the computation specification 534 represents execution of the computation node 552.

Figure 6:
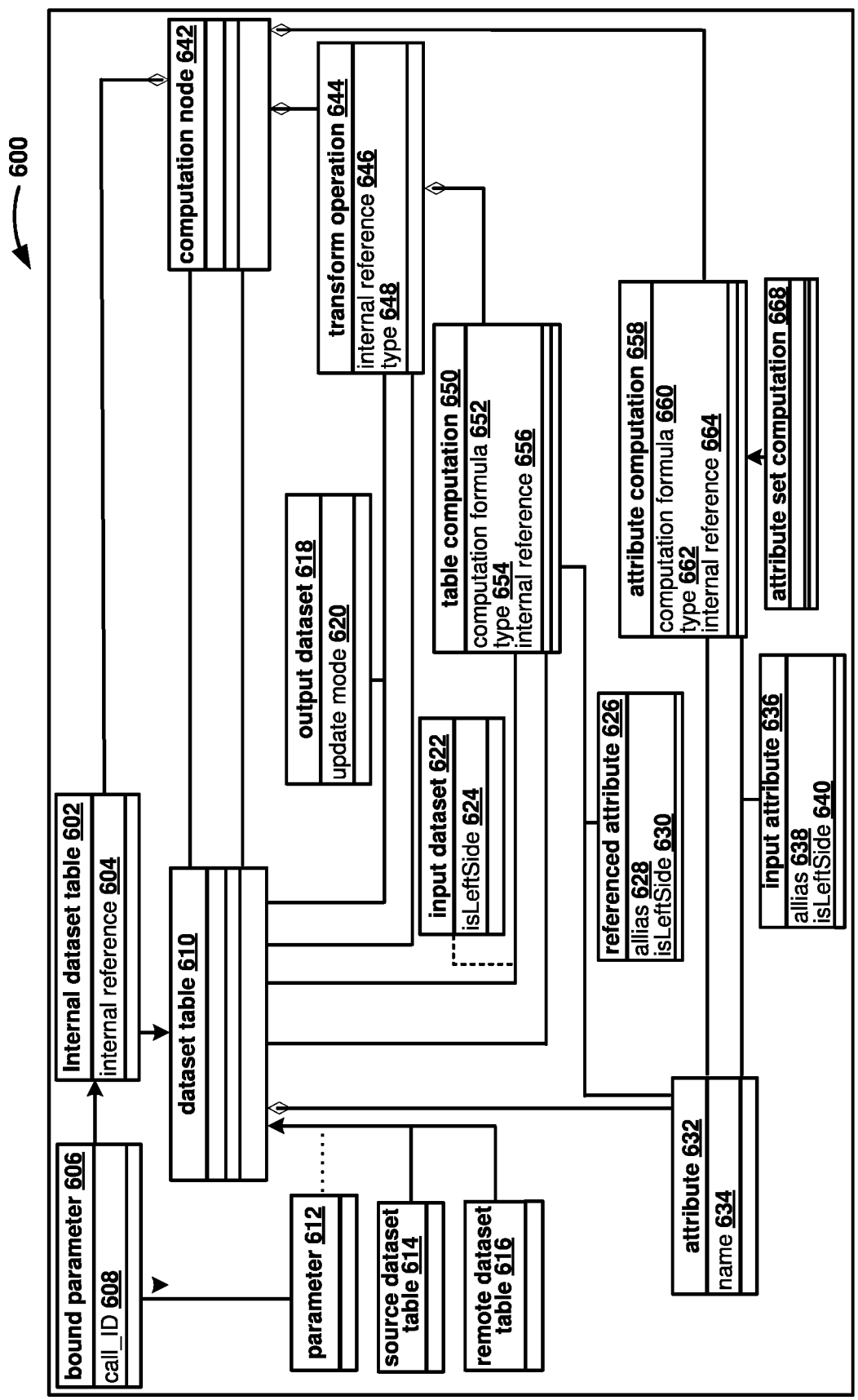
FIG. 6 is a UML class diagram illustrating an attribute level lineage model, according to one embodiment.

FIG. 6 is a UML class diagram 600 illustrating an attribute level lineage model, according to one embodiment. The UML class diagram 600 graphically represents a static view of one or more aspects of the system 300, FIG. 3. In one embodiment, the UML class diagram 600 represents an attribute level lineage model of the system 300. In accordance with the attribute level lineage model, the system 300 may extract attribute level lineage information in the form of a computation node graph such as the computation node graph 320, FIG. 3. The UML class diagram 600 defines dependencies among attributes of data structures. The UML class diagram 600 includes dataset table 610. The dataset table 610 may be a remote dataset table 616, a source dataset table 614, or a parameter 612. The dataset table 610 is referenced by internal dataset table 602. Internal dataset tables represent intermediate dataset tables that are created during processing of executable objects such as the executable object 522, FIG. 5. The internal dataset tables are deleted when the processing of the executable objects is completed. Internal dataset tables are extracted from corresponding computation specifications. When an internal dataset table is extracted from a computation specification, the computation specification is a lineage owner for the internal dataset table. For example, the internal dataset table 602 may be extracted from the computation specification 534, FIG. 5. In this case, the computation specification 534 is the lineage owner for the internal dataset table 602. The internal dataset table 602 has a property "internal reference" 604. Value of the property "internal reference" 604 identifies a variable or block of instructions corresponding to the internal dataset table 602 within the computation specification 534.

In one embodiment, when the computation specification 534, FIG. 5, specifies a call to the executable object 522, bound parameter 606 is generated. The bound parameter 606 is a type of internal dataset table. Bound parameters represent input/output parameters (e.g., the parameter 612) of the executable object 522 that are bound to internal variables of the computation specification 534. The bound parameters are created within the computation node for calls occurring in the computation specification. For example, the bound parameter 606 may be created within the computation node 642 for a call occurring in the computation specification 534. The bound parameter has a property "call_ID" 608. Value of the property "call_ID" 608 uniquely identifies the call to the executable object 522 within the computation specification 534.

In one embodiment, the dataset table 610 represents the dataset table 546, FIG. 5. The dataset table 610 may have zero or more attributes such as attribute 632. The attribute 632 has a property "name" 634 and may be identified within the dataset table 610 via a value of the property "name" 634. The dataset table 610 is associated with the computation node 642. The computation node 642 is similar to the computation node 552 described above with reference to FIG. 5. The computation node 642 describes relationship between a set of input datasets and a set of output datasets into which data items have been inserted, updated, or deleted from. The computation node 642 defines one or more transform operations such as the transform operation 644. The transform operation 644 takes one or more input datasets in the form of dataset tables such as the dataset table 610. The input dataset tables may include internal dataset tables such as the internal dataset table 602.

The transform operation 644 has properties "internal reference" 646 and "type" 648. The property "internal reference" 646 refers to the computation specification 534 that is the lineage owner for the transformation operation 644. Value of the property "type" 648 defines a type of update mode for zero or more output datasets produced by the transformation operation 644. For example, the output dataset 618 includes a property "update mode" 620. Value of the property "update mode" 620 defines a type of transformation applied on the input datasets to generate the output dataset. In various embodiments, the property "update mode" 620 may have value "define", "replace", "update", "upsert", "insert", or "delete. The value "define" is assigned to the property "update mode" 620 when data items produced by the transform operation 644 exclusively define the contents of the output dataset. The value "replace" is assigned to the property "update mode" 620 when data items of the output dataset are replaced by the data items produced by the transform operation 644. The value "update" is assigned to the property "update mode" 620 when data items produced by the transform operation 644 are used to update some data items of the output dataset. The value "upsert" is assigned to the property "update mode" 620 when data items produced by the transform operation 644 are used to either update existing data items or insert new data items in the output dataset. The value "insert" is assigned to the property "update mode" 620 when data items produced by the transform operation 644 are used to insert new data items in the output dataset. The value "delete" is assigned to the property "update mode" 620 when data items produced by the transform operation 644 are removed from the output dataset.

In addition, the transform operation 644 is associated with one or more table computations such as table computation 650. A table computation describes an elementary operation that is applied on a set of rows of the one or more input dataset tables of the transform operation 644 to compute one or more sets of rows of the output dataset 618. The table computation 650 has properties "computation formula" 652, "type" 654, and "internal reference" 656. Value of the property "computation formula" 652 specifies an operation performed by the table computation 650. For example, when the table computation 650 performs a "relational join" operation, the value of the "computation formula" 652 may specify a join condition. The property "type" 654 may have value "bind" when the table computation 650 binds a bound parameter dataset with another dataset, or value "blackbox" when no input attribute is specified for the table computation 650 and the input datasets are directly related to a table computation of this type. The property "internal reference" 656 refers to the lineage owner that in this case is the computation specification 534.

In one embodiment, the property "computation formula" 652 of the table computation 650 refers to at least one referenced attribute 626. The referenced attribute 626 has properties "alias" 628 and "isLeft Side" 630. Value of the property "alias" 628 indicates a name of a variable that represents the attribute within the "computation formula" 652. The property "isLeft Side" 630 indicates that the referenced attribute 626 is the left operand of an operator within the "computation formula" 652. Respectively, when the referenced attribute 626 has a property "isRight Side" (not illustrated), the referenced attribute 626 would be the right operand of the operator. When a set of input attributes for the table computation 650 is unknown, the table computation 650 utilizes a set of input datasets such as input dataset 622. The input dataset 622 includes a property "isLeftSide" 624.

In one embodiment, the transform operation 644 includes attribute computation 658. An attribute computation describes how value of a single attribute (named "output attribute") is computed from values of one or more "input attributes". An attribute computation may be of various types. Type of the attribute computation 658 is defined by the value of property "type" 662 of the attribute computation 658. The value of the property "type" 662 is "identity function" when each output attribute value is generated by applying the identity function to a value of a single input attribute. The value of the property "type" 662 is "scalar function" when each output attribute value is computed from an "n-ary" scalar function where each argument of the function is a value coming from an input attribute. The value of the property "type" 662 is "aggregate function" when each output attribute value is computed from an aggregate function applied over a set of values of a single input attribute. In one embodiment, the value of the property "type" 662 is further defined as follows. If values of the output attribute are computed from a subset of the values of the input attribute, the value of the property "type" 662 is "restricted aggregate". If each output attribute value is calculated by a window function applied over the set of values of a single input attribute, then the value of the property "type" 662 is "window function". When the value of the property "type" 662 is "set operation", the set of output attribute values is computed from a set operation (union, difference, intersection) over the set of values coming from one or more input attributes. When the value of the property "type" 662 is "constant", the output attribute is mapped to a constant value. In addition, the attribute computation 658 has properties "computation formula" 660 and "internal reference" 664.

In one embodiment, the attribute computation 658 is associated with an attribute set computation node 668. The attribute set computation node 668 describes how values of one or more attributes of an output dataset are computed from the values of one or more attributes of an input dataset. The attribute set computation node 668 may be of a "row-oriented" computation type where a row of an output dataset is computed based on a set of rows of the input dataset, or a "set-oriented" computation type where a row of an output dataset is computed from a set of rows of the input dataset or the whole input dataset.

Figure 7:
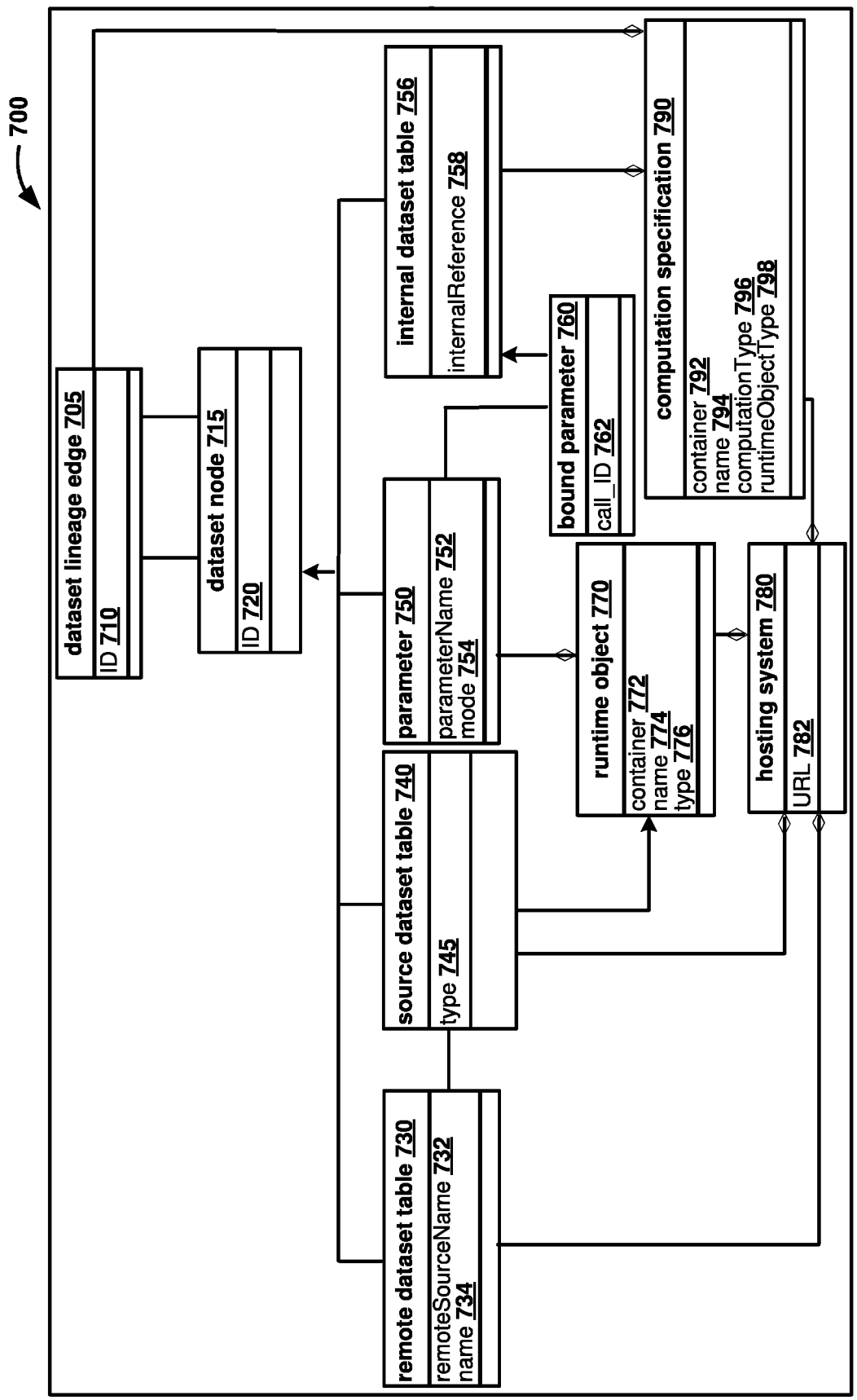
FIG. 7 is a UML class diagram illustrating a model of a dataset level lineage graph, according to one embodiment.

FIG. 7 is a UML class diagram 700 illustrating a model of a dataset level lineage graph, according to one embodiment.

Dataset level lineage graphs describe lineage relationships between datasets. The UML class diagram 700 graphically represents a static view of the model of the dataset level lineage graph. In one embodiment, the system 300, FIG. 3, builds a dataset lineage graph based on the computation node graph 320 and in accordance with the model illustrated by the UML class diagram 700. The UML class diagram 700 includes dataset node 715 and dataset lineage edge 705. The dataset node 715 represents a dataset table extracted from a computation specification. The dataset lineage graph may include a number of dataset nodes like the dataset node 715. A node of the number of dataset nodes may be either a remote dataset table 730, a source dataset table 740, a parameter 750, or an internal dataset table 756. The remote dataset table 730, the source dataset table 740, the parameter 750, and the internal dataset table 756 represent different types of dataset tables for the dataset node 715. The dataset node 715 has a property "ID" 720. The dataset node 715 may be uniquely identified within the dataset lineage graph based on value of the property "ID" 720.

The remote dataset table 730 has properties "remoteSourceName" 732 and "name" 734. In one embodiment, value of the property "remoteSourceName" 732 specifies a name of a remote connection to a data source system. The remote dataset table 730 represents the source dataset table 740. The source dataset table 740 may be represented by zero or more remote dataset tables such as the remote dataset table 730. The source dataset table 740 has a property "type" 745. The parameter 750 has properties "parameterName" 752 and "mode" 754. The internal dataset table 756 has a property "internalReference" 758. In one embodiment, the source dataset table 740 and the parameter 750 represent different types of runtime objects. Hence, the source dataset table 740 and the parameter 750 are associated with runtime object 770 in the UML class diagram 700. The runtime object 770 has a corresponding container 772 and properties "name" 774 and "type" 776.

In one embodiment, the internal dataset table 756 is extracted from computation specification 790. The value of the property "internalReference" 758 identifies a variable or block of instructions corresponding to the internal dataset table 756 within the computation specification 790. The internal dataset table 756 is associated with bound parameter 760. The bound parameter 760 is a type of internal dataset table. Bound parameters represent input/output parameters (e.g., the parameter 750) of the runtime object 770 that are bound to internal variables of the computation specification 790. Bound parameters are created for a call occurring in the computation specification 790. The bound parameter has a property "call_ID" 762. Value of the property "call_ID" 762 uniquely identifies the call to the runtime object 770 within the computation specification 790.

In one embodiment, the remote dataset table 730, the source dataset table 740, the runtime object 770, and the computation specification 790 are extracted from a hosting system 780. The hosting system 780 may be a data source system (DSS) or a metadata repository system (MDS). The hosting system 780 may be accessed based on a value of the property "URL" 782.

In one embodiment, the dataset lineage edge 705 is extracted from the computation specification 790. The dataset lineage edge 705 links an origin dataset node to a destination dataset node. Based on the dataset lineage edge 705, it may be determined that the contents of the origin dataset table contribute to produce the contents of the destination dataset table. The dataset lineage edge 705 has a property "ID" 710. Additionally, the dataset lineage edge 705 may have a property "lineage owner" (not illustrated) to refer to the corresponding computation specification.

In one embodiment, the computation specification 790 is described by a container 792 describing location of the computation specification 790 within the hosting system 780 (e.g., a folder or package path) and a name 794 of the computation specification 790 within the container. The computation specification 790 may have a number of properties including properties "computation type" 796 and "runtimeObjectType" 798.

Figure 8:
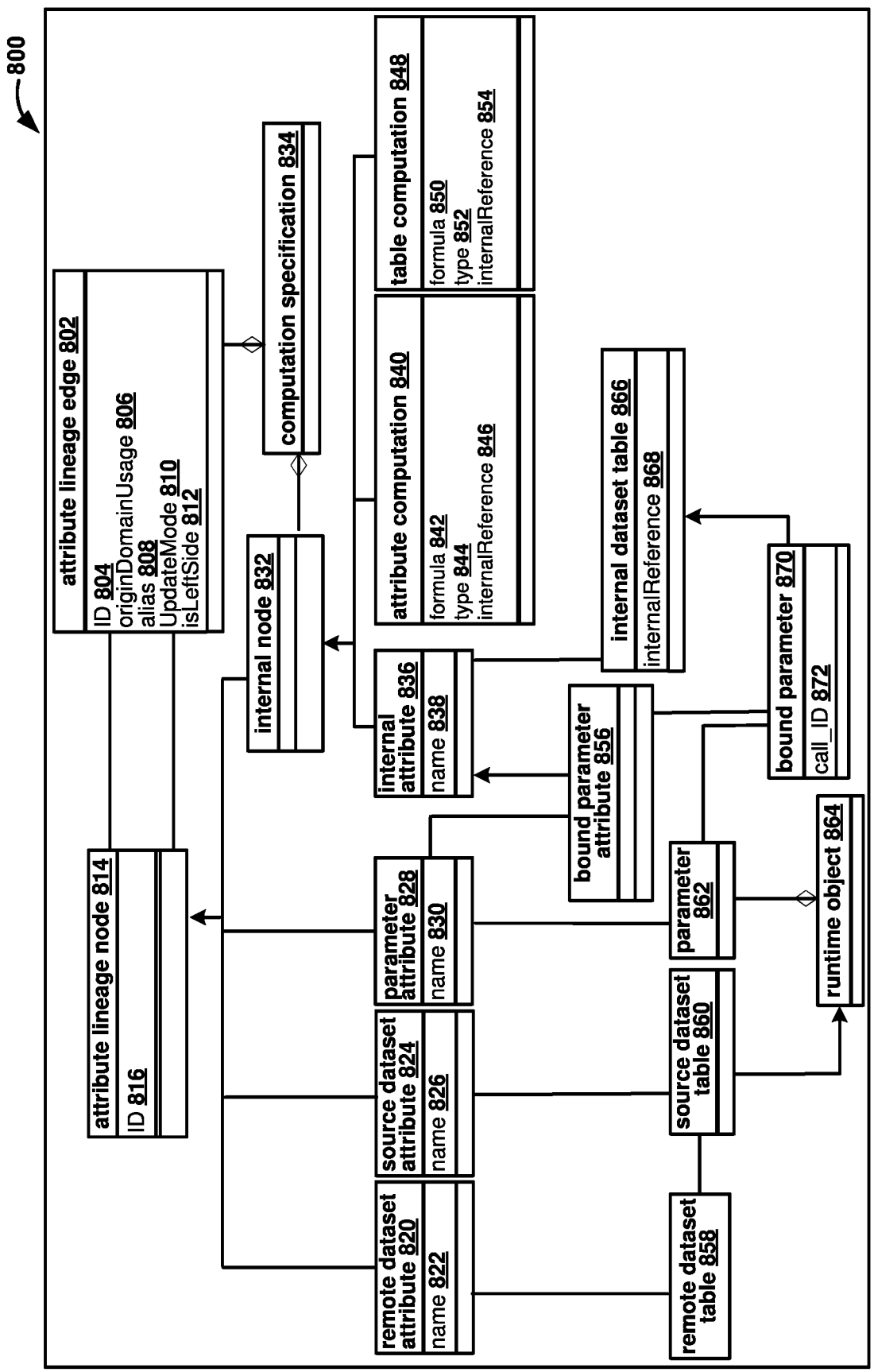
FIG. 8 is a UML class diagram illustrating a model of an attribute level lineage graph, according to one embodiment.

FIG. 8 is a UML class diagram 800 illustrating a model of an attribute level lineage graph, according to one embodiment. Attribute level lineage graphs describe lineage relationships between attributes of datasets. The UML class diagram 800 graphically represents a static view of the model of the attribute level lineage graph. In one embodiment, an attribute level lineage graph is built based on the computation node graph 320 and in accordance with the model illustrated by the UML class diagram 800. The UML class diagram 800 includes attribute lineage node 814 and attribute lineage edge 802. The attribute lineage node 814 has a property "ID" 816. The attribute lineage node 814 is associated with a number of types of attribute lineage nodes including remote dataset attribute 820, source dataset attribute 824, parameter attribute 828, and internal node 832.

In one embodiment, the source dataset attribute 824 is extracted from source dataset table 860. The source dataset attribute 824 represents a column within the source dataset table 860. The source dataset attribute 824 corresponds to a component of a dataset from which the source dataset table 860 is extracted. For example, the source dataset attribute 824 may have additional property with a value pointing to the component of the dataset. The source dataset attribute 824 has a property "name" 826. Value of the property "name" 826 is unique within the source dataset table 860. In one embodiment, the source dataset table 860 represents the source dataset table 740, FIG. 7.

In one embodiment, the remote dataset attribute 820 is extracted from the remote dataset table 858. The remote dataset attribute 820 represents a column within the remote dataset table 858. The remote dataset attribute 820 has a property "name" 822. The remote dataset table 858 represents the remote dataset table 730, FIG. 7. In one embodiment, the remote source attribute 820 may be an input for a number of computation nodes including attribute computation 840 and table computation 848.

In one embodiment, the parameter attribute 828 is extracted from the parameter 862. The parameter attribute 828 represents a column within the parameter 862 table. The parameter attribute 828 includes a property "name" 830. The parameter 862 may be referred by multiple computation nodes. For example, the parameter may be referred by a computation specification when the computation specification specifies a call to the runtime object 864 that owns the parameter 862. Bound parameters such as the bound parameter 870 are created within the extracted computation node for a call occurring in the computation specification. The bound parameter 870 includes a property "call_ID" 872. Thus, the bound parameter attribute 856 is created for an attribute of the bound parameter 870 and refers to the corresponding attribute of the bound parameter 870.

In one embodiment, the internal node 832 is extracted from the computation specification 834. Hence, the computation specification 834 is a lineage owner for the internal node 832. The internal node 832 represents a computation node. Computation nodes describe relationships between input datasets and output datasets into which data items have been inserted, updated, or deleted from, when an executable object defined by a computation specification executes. A computation node may be of type internal attribute 836, attribute computation 840, or table computation 848. In accordance with the UML class diagram 800, a computation node may include one or more computation nodes. A node of the one or more nodes may be either an internal attribute 836, attribute computation 840, or table computation 848. In one embodiment, the internal attribute 836 has a property "name" 838. The internal attribute 836 represents an attribute of an internal dataset. The internal attribute 836 may be described as a specific case of the bound parameter attribute 856 that represents a column of the bound parameter 870.

In one embodiment, the attribute computation 840 represents computation of an attribute or an attribute set within the internal node 832 that is extracted from the computation specification 834. The attribute computation 840 receives input data values from attribute lineage nodes. Types of attribute lineage nodes that may be input nodes for the attribute computation 840 include the remote dataset attribute 820, the source dataset attribute 824, and the parameter attribute 828. In addition, the attribute computation node 840 may receive input data from internal nodes of type "attribute computation". Based on the received input data values, the attribute computation 840 computes a scalar value/a set of scalar values for a single output attribute (in the case of an attribute computation) or an array of scalar values/a set of arrays of scalar values, when there are multiple output attributes (in the case of an attribute set transformation). The values computed by the attribute computation 840 may be presented through one or more output nodes associated with the attribute computation 840. Types of attribute lineage nodes that may be output nodes for the attribute computation 840 include the remote dataset attribute 820, the source dataset attribute 824, the parameter attribute 828, another attribute computation node 840, and the table computation 848. The attribute computation 840 has properties "formula" 842, "type" 844, and "internalReference" 846. The value of the property "type" 844 indicates how output values are produced from input values. In addition to the types of attribute computations introduced earlier (see FIG. 5 and FIG. 6), attribute computations of types "row-oriented" (a list of scalar values computed by the attribute computation node is obtained through one scalar value from an input node) and "set-oriented" (a list of scalar values computed by the attribute computation node is obtained through a set of scalar values from an input node) are utilized for attribute set computations.

In one embodiment, the table computation 848 has properties "formula" 850, "type" 852, and "internalReference" 854. The table computation 848 is associated with a computation of a table within a computation node that is extracted from the computation specification 834. Input nodes for the table computation 848 may be attribute nodes (such as the remote dataset attribute 820, the source dataset attribute 824, the parameter attribute 828, etc) or attribute computation nodes (such as the attribute computation 840). In one embodiment, the table computation 848 does not have an output node.

In one embodiment, relationships between the attribute computation 840 and input or output nodes of the attribute computation 840 are described by attribute lineage edges such as the attribute lineage edge 802. In addition, the attribute lineage edges describe relationships between the table computation 848 and input nodes of the table computation 848. The attribute lineage edge 802 connects a first node (e.g., origin) with a second node (e.g., destination) within the attribute lineage graph represented in accordance with the attribute lineage data model defined by the UML class diagram 800. An origin of the attribute lineage edge 802 may be an internal dataset attribute node, a remote dataset table attribute node, a source dataset table attribute node, a parameter attribute node, or an attribute computation node. A destination of the attribute lineage edge 802 may be an internal dataset attribute node, a remote dataset table attribute node, a source dataset table attribute node, a parameter attribute node, an attribute computation node, or a table computation.

In one embodiment, the attribute lineage edge 802 has properties "ID" 804, "originDomainUsage" 806, "alias" 808, "UpdateMode" 810, and "isLeftSlde" 812. Value of the property "originDomainUsage" 806 indicates a domain of values of the origin node that contributes to the domain of values of the destination node. For example, when the value of the "originDomainUsage" 806 is "full", the whole domain of values of the origin node contributes to the domain of values of the destination node. Similarly, when the value of the "originDomainUsage" 806 is "partial", a subset of the domain of values of the origin node contributes to the domain of values of the destination node. Value of the property "UpdateMode" 810 indicates impact that the values of an origin node have on the values of a destination node. The update mode is similar to the update mode of the transform operation defined in an extracted computation node graph. Therefore, the value of the property "UpdateMode" 810 may be one of "define", "replace", "update", "upsert", "insert", and "delete". Value of the property "alias" 808 indicates a variable name that represents an origin node within the text of the "formula" 850 property of a corresponding table computation 848. Value of the property "isLeftSide" 812 indicates whether the dataset to which the origin node belongs to is used as the left or right-side operator in the corresponding computation formula.

Figure 9:
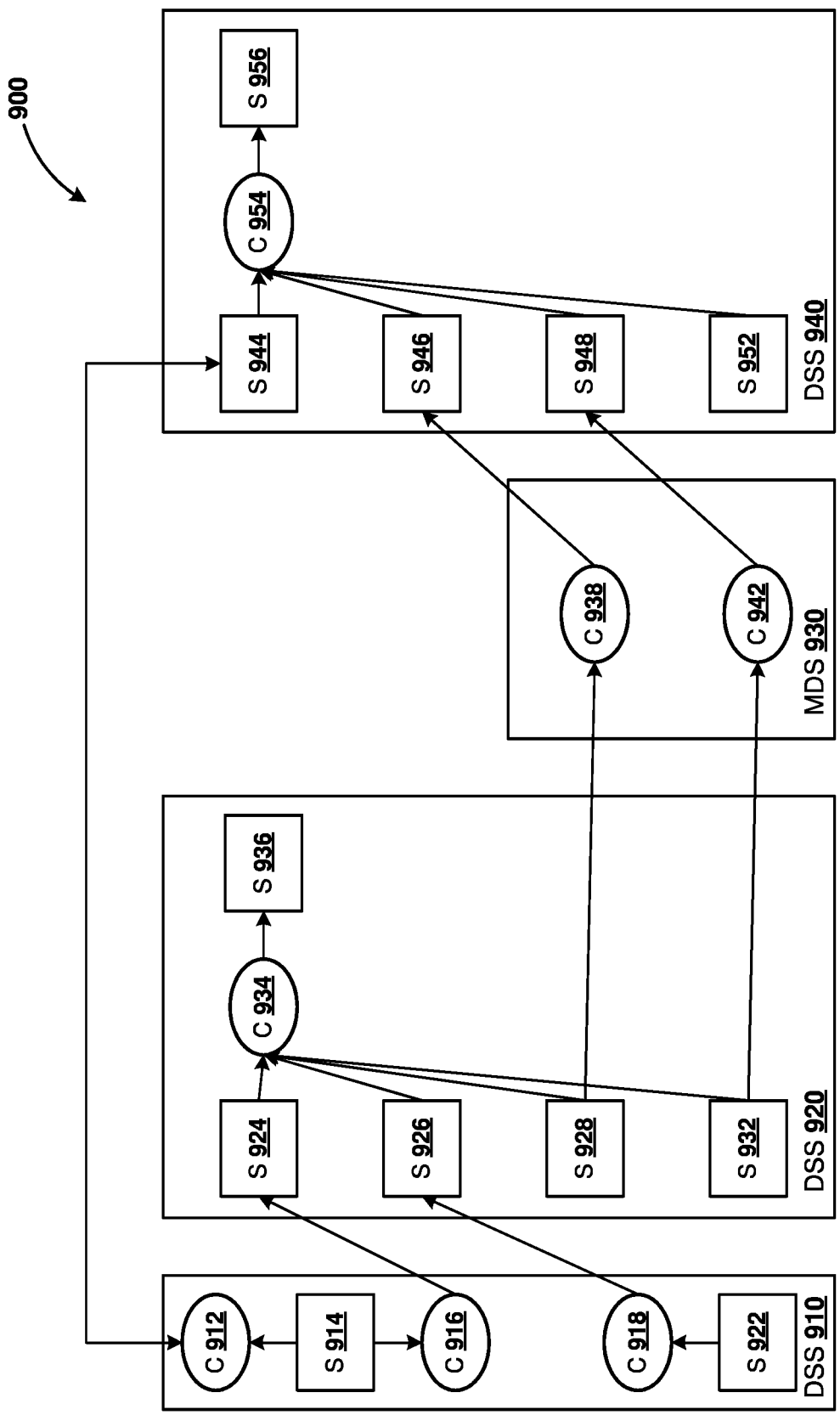
FIG. 9 is a block diagram illustrating an exemplary network of heterogeneous systems, according to one embodiment.

FIG. 9 is a block diagram illustrating an exemplary network 900 of heterogeneous systems, according to one embodiment. The network 900 includes data source system (DSS) 910, DSS 920, DSS 940, and metadata repository system (MDS) 930. The data source systems (DSSs) 910, 920, and 940 provide programmatic access and manipulation capabilities over datasets. Datasets are stored at the DSSs 910, 920, and 940 in heterogeneous formats that are specific to the DSSs. For example, the DSS 910 is an Apache Hadoop® cluster. The DSS 910 includes datasets S 914 and S 922 and computation specifications C 912, C 916, and C 918 that are associated with the datasets. The dataset S 914 is a Hadoop Distributed File System (HDFS) file with semi-structured JavaScript Object Notation (JSON) format. The dataset S 922 is a directory of unstructured HDFS files. The computation specifications C 912, C 916, and C 922 are Apache Hadoop® data pipelines. The DSS 920 and the DSS 940 are database systems. The DSS 920 includes datasets S 924, S 926, S 928, S 932, and S 936 that are relational tables, and the computation specification C 934 that is a Structured Query Language (SQL) query. The DSS 940 includes datasets S 944, S 946, S 948, S 952, and S 956 that are relational tables, and computation specification 954 that is a database procedure. The MDS 930 is an ETL system that extracts datasets from one system, executes various computations over the datasets and stores calculations in another system. The MDS 930 provides access to computation specifications describing the computations. However, the MDS 930 does not provide access to datasets. For example, the computation specifications C 938 and C 942 that are ETL scripts are stored at the MDS 930.

In one embodiment, S 914 and S 922 are non-derived datasets. Non-derived datasets include "native" data which are not computed from other datasets. For example, a dataset that includes sensor data is a non-derived dataset. The dataset S 922 is associated with computation specification C 918. The computation specification C 918 is applied over the dataset S 922 to generate dataset S 926 that is stored at the DSS 920. The dataset 926 is derived from the dataset S 922 based on the computation specification C 918. Similarly, dataset S 924 is derived from the dataset S 914 based on the computation specification C 916, and dataset S 944 is derived from the dataset S 914 based on the computation specification C 912. Derived datasets are datasets computed from one or more other datasets. For example, a dataset generated by a query over one or more datasets (e.g., a database query) is a derived dataset. In addition, a program that reads two datasets, applies data transformations and produces a new dataset as output, generates a derived dataset. Derived datasets in a data source system may be produced from datasets coming from other data source systems.

Figure 10:
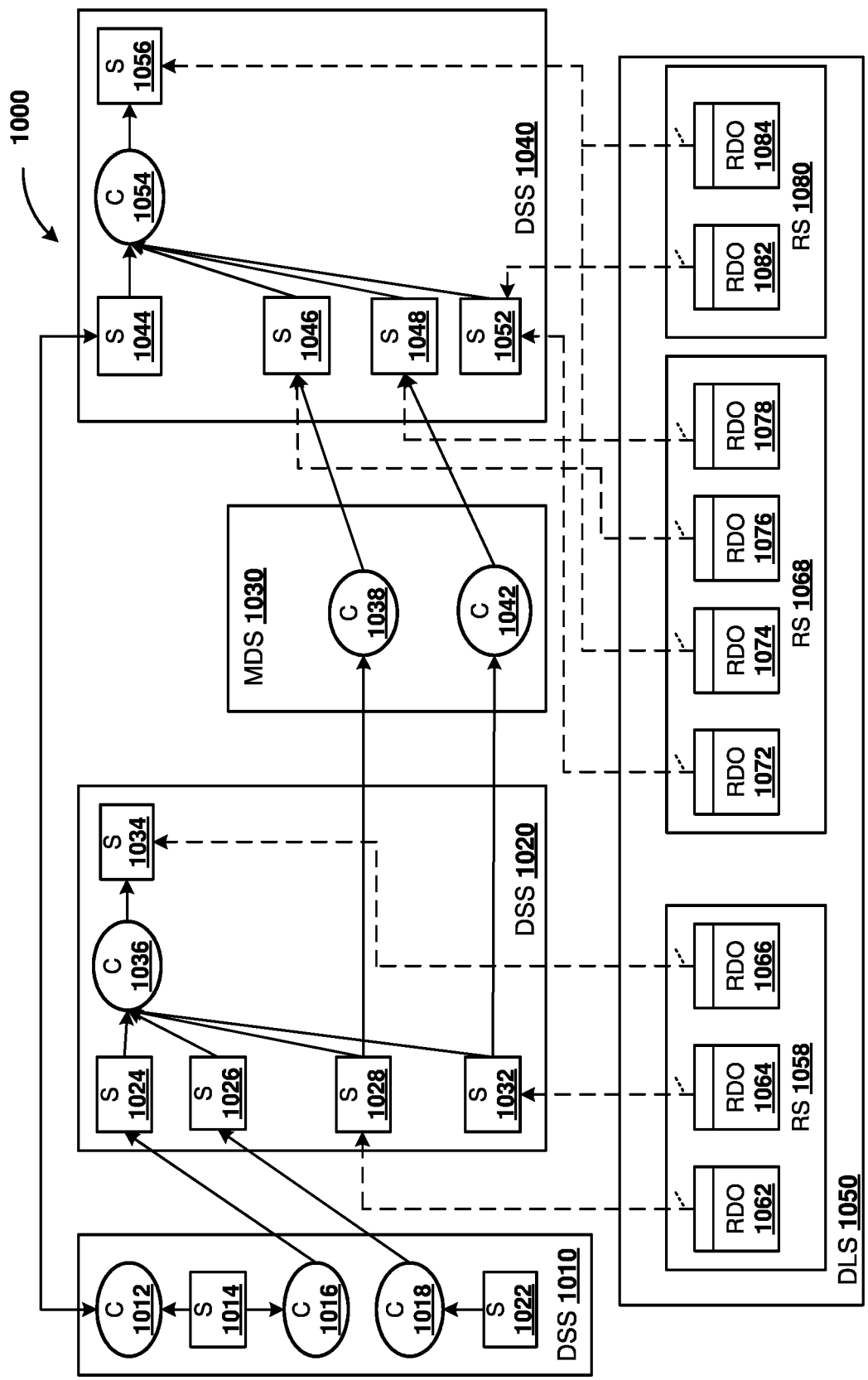
FIG. 10 is a block diagram illustrating a system that federates heterogeneous lineage data, according to one embodiment.

FIG. 10 is a block diagram illustrating a system 1000 that federates lineage data from heterogeneous systems, according to one embodiment. The system 1000 includes DLS 1050. The DLS 1050 is similar to the DLS 305, FIG. 3. The DLS 1050 provides a data lineage service. The DLS 1050 federates lineage data from a network of heterogeneous systems. In one embodiment, the DLS 1050 federates heterogeneous lineage data from the network 900, FIG. 9, and the DSS 1010, DSS 1020, MDS 1030, and DSS 1040 represent the DSS 910, DSS 920, MDS 930, and DSS 940, respectively, that were described above with reference to FIG. 9.

In one embodiment, a remote source RS 1058 is defined within the DLS 1050 for the DSS 1020, and two remote sources RS 1068 and RS 1080 are defined within the DLS 1050 for the DSS 1040. A remote source represents a remote source connection established between the DLS 1050 and a DSS. For example, the remote source connection RS 1058 may be established between the DLS 1050 and the DSS 1020. The RS 1058 includes a set of remote dataset tables, represented as rectangles with a header. A remote dataset table is associated with a dataset in the DSS 1020 (associations are shown as dotted lines). Associations between remote dataset tables and datasets are based on a mapping logic implemented by extractors (not illustrated) of the DLS 1050 that connect to the DSSs and extract the lineage data. This mapping is deterministic for a given extractor and a given dataset. The dataset tables that are returned by an extractor's mapping logic for a dataset may be referred to as source dataset tables. For example, for an extractor, the mapping of dataset S 1052 in DSS 1040 into one or more dataset tables will be identical for both remote sources RS 1068 and RS 1080 created with that extractor, if the extractor is authorized to access a full representation of the dataset S 1052.

In one embodiment, remote sources are defined with different credentials (e.g., configured by an administrator). Therefore, different source dataset tables may be returned by the extractor if the connection for RS 1068 or RS 1080 provide different restricted access to the representation of S 1052. Thus, the mapping may return one table with RS 1068 and two tables with RS 1080, or the same table may be returned for both RS 1068 and RS 1080 but some attributes may be missing for RS 1068. For example, security within the remote sources may be defined on the level of dataset attributes. This way, two different users may be allowed to access different attributes of one dataset. Nevertheless, source dataset tables returned by the extractor's mapping logic through defined connections may be merged at the DLS 1050 regardless of the different credentials of the connections utilized by the extractor. This way, a consolidated representation of the mapping of S 1052 into a set of dataset tables may be obtained at the DLS 1050. The consolidated representation may be referred to as a merged source dataset table.

In one embodiment, the DLS 1050 receives, for a given connection and a dataset, both a set of source dataset tables and a set of remote dataset tables (remote data objects), a remote data object being a "proxy" on a source dataset table. Remote data objects may include portions of data stored in the corresponding source dataset tables. Alternatively, the remote data objects may fully represent the data in the corresponding source dataset tables. For example, for S 1052, the DLS 1050 may receive the remote data object (RDO) 1072 and a corresponding source dataset table (not illustrated) from the RS 1068. In addition, for the S 1052, the DLS 1050 may receive the RDO 1082 and a corresponding source dataset table (not illustrated) from the RS 1080. Source dataset tables are merged while remote data objects are not. Thus, when the RS 1068 and the RS 1080 are defined with different credentials, the RDO 1071 and the RDO 1082 (and corresponding source dataset tables) may include different portions of data from S 1052. When source dataset tables corresponding to the RDO 1072 and the RDO 1082 are merged, a merged source dataset table for S 1052 may be created at the DLS 1050. The merged source dataset table consolidating data of S 1052 that is accessible through the connections RS 1068 and RS 1080 that are defined with different credentials. In this case, the RDO 1072 and the RDO 1082 are "proxies" to data in the corresponding merged source dataset table because the RDO 1072 and the RDO 1082 include portions of the data within the merged source dataset table (not illustrated).

In one embodiment, datasets S 1024 and S 1026 are not visible from the RS 1058. That is, data and computation specifications of the datasets S 1024 and S 1026 are not accessible based on credentials of the RS 1058 and, hence, the data and computation specifications of the datasets S 1024 and S 1026 are not extracted through the RS 1058. Similarly, S 1044, S 1046, and S 1048 are not accessible (hence not visible) based on credentials of the RS 1080. However, datasets S 1046 and S 1048 are both accessible (and visible) from the RS 1068.

In one embodiment, a user of the DLS 1050 is authorized to access the RS 1058 and the RS 1080. When the user requests lineage of RDO 1066 with a data-oriented view, a lineage graph is automatically generated. The lineage graph depends on two factors: (1) the remote dataset tables accessible to the user, and (2) the content of the data lineage storage managed by the data lineage service. Regarding the first factor, the user may be able to see a dependency of RDO 1066 on RDO 1062 and RDO 1064 since these are the impacting RDOs. Regarding the second factor, the extractor accesses lineage information within the DSS 1020 through a metadata connection. Based on credentials of the metadata connection, the extractor accesses data or computation specifications in the DSS 1020. When the extractor has sufficient privileges to access the computation specification C 1036, the extractor may return (1) a mapping of datasets S 1024 and S 1026 into source dataset tables based on the mapping logic, and (2) the data lineage information of S 1034 with respect to the source dataset tables that were returned.

Figure 11:
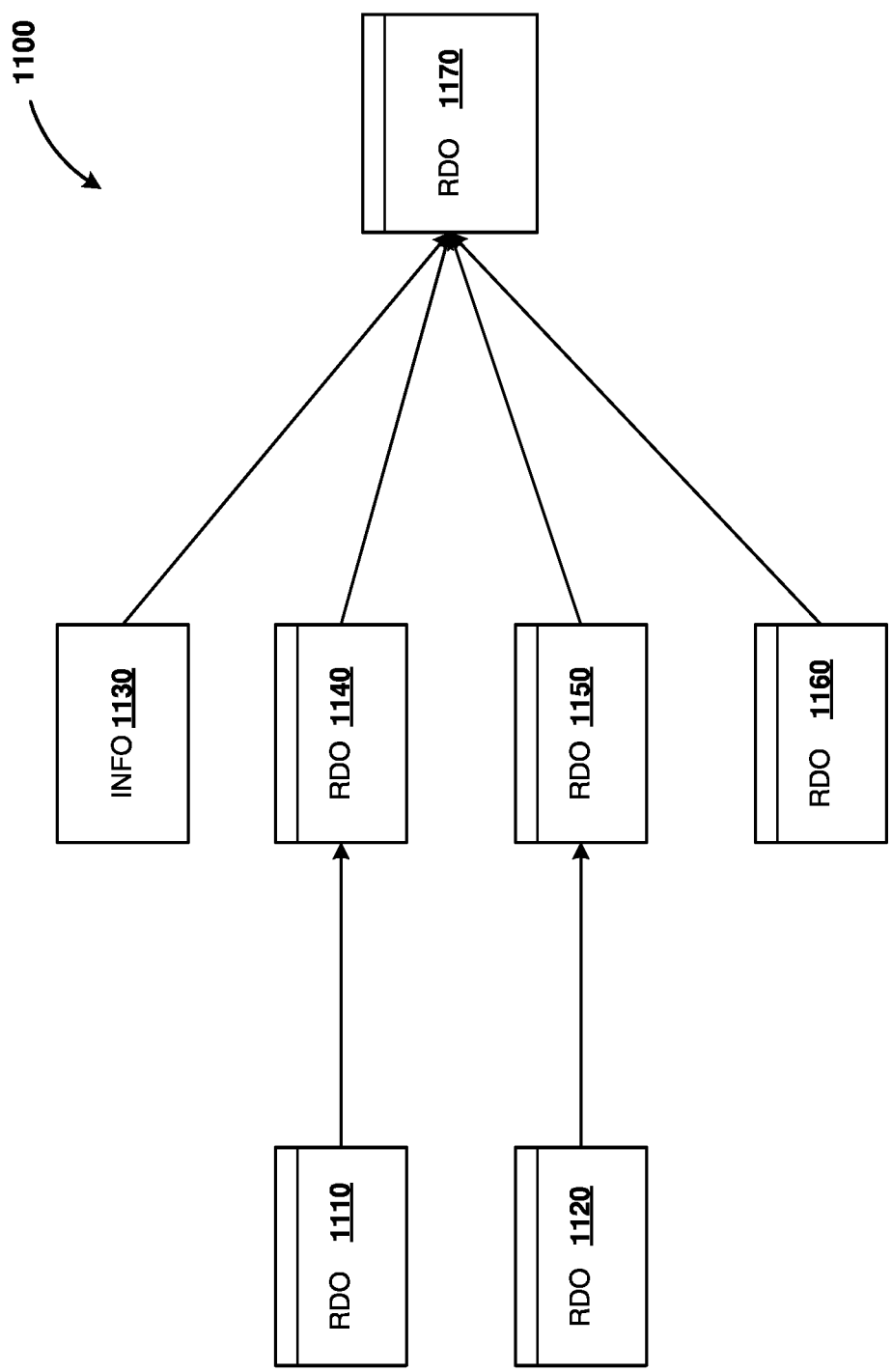
FIG. 11 is a block diagram illustrating a data structure that provides lineage information for a data object, according to one embodiment.

FIG. 11 is a block diagram illustrating a data structure 1100 that provides lineage information for a data object, according to one embodiment. In an exemplary scenario, a user has privileges to access the RS 1058 and the RS 1068. The user requests data lineage information for the RDO 1074, FIG. 10, with a data-oriented view. Assuming that the data lineage extractor of the DLS 1050 (not illustrated) has a metadata connection to access computation specification C 1054, FIG. 10, during the extraction source dataset tables are created for datasets S 1044, S 1046, S 1048, and S 1052, and lineage relationships are created between the RDO 1074 and the created source dataset tables. As explained above, merged source dataset tables will be created by merging the representations obtained from the connection of RS 1068 and the metadata connection created by the same extractor. Similarly, it is assumed that the data lineage extractor for system MDS 1030 is authorized to access computation specifications C 1038 and C 1042. During the extraction, source dataset tables are created for datasets S 1028, S 1032, S 1046, and S 1048, and lineage relationships are created between the created source dataset tables.

In one embodiment, the mapping logic of the extractor for the MDS 1030 and mapping logic of the extractor for the RS 1068 are different. Therefore, the source dataset tables returned by the extractors for a given dataset, (e.g., S 1046) are different. Based on the reference that an attribute of a source dataset table has to the corresponding component of a dataset, lineage relationships between the attributes of the source dataset tables returned by an extractor are created. The lineage relationships are created during the loading of extracted data lineage information into the data lineage storage. Similarly, lineage relationships may be created between the source dataset tables returned by the extractor of the MDS 1030 and the extractor of the RS 1058 for datasets S 1028 and S 1032. The lineage relationships define data lineage dependencies between RDO 1074, and RDO 1062 and RDO 1064. The data lineage dependencies go through source dataset tables. In one embodiment, privileges granted to the user are examined to determine whether the user is authorized to access RDOs from various remote data sources. When it is determined that the user is authorized to access the RS 1058 and the RS 1068, the lineage information for the RDO 1074 will be as illustrated by the data structure 1100.

In one embodiment, the data structure 1100 includes RDO 1110 and RDO 1120. The RDO 1110 represents the RDO 1062 and the RDO 1120 represents the RDO 1064, FIG. 10. The RDOs 1110 and 1120 are associated with RDO 1140 and RDO 1150, respectively. Based on the association, the user may determine that the RDO 1140 is derived from the RDO 1110 and the RDO 1150 is derived from the RDO 1120.

In one embodiment, the RDOs 1140 and 1150 are associated with RDO 1170. The RDO 1170 represents the RDO 1074, FIG. 10. Based on the associations, it may be determined that the RDO 1170 is derived from the RDO 1140, the RDO 1150, RDO 1160, and INFO 1130. Based on the privileges of the user to access RS 1058 and RS 1068, RDOs included in the RS 1058 or the RS 1068 may be presented to the user. However, the RDO 1074 for which the user requests lineage information, is originally derived from four datasets, including the dataset S 1052 (FIG. 10). The RDO 1082 is associated with the dataset S 1052 and is included in RS 1080. Since the user is not authorized to access the RS 1080, the RDO 1082 is obfuscated from the generated data structure 1100 and is replaced with the node INFO 1130 to indicate the RDO 1170 is derived from four RDOs in total.

In one embodiment, the data lineage structure 1100 providing lineage information for the RDO 1170 may be annotated with summary information. The summary information may include, for a node of the data lineage structure 1100 that is not a table computation node, a description of how values of attributes of the node affect values of attributes of a descendent node, how the values of the attributes of the node are affected by values of attributes of an ascendant node, and types of computations applied to the attributes of the ascendant node and to the attributes of the node. For example, the summary information for node RDO 1140 may include a description of how values of attributes of the RDO 1140 are affected by values of attributes of nodes RDO 1110 and RDO 1120, how the values of the attributes of the RDO 1140 affect values of attributes of the node RDO 1170, and types of computations applied over the attributes of RDO 1110 and RDO 1120 to compute the attributes of the RDO 1140 and types of computations applied over the attributes of the RDO 1140 to compute the attributes of the RDO 1170. The summary information is pre-computed when a computation node graph corresponding to the RDO 1170 is loaded into a DLS storage. The summary information is readily provided when the lineage data structure 1100 is provided for rendering at a UI such as the UI 115, FIG. 1. In various embodiments, the summary information may be attached to the RDO 1140, may be visible when a pointer on the UI is rolled over the RDO 1140, or may be displayed upon receiving a selection input from the UI.

In one embodiment, the summary information is computed based on one or more predefined rules. The one or more rules may include rules to compute impacting domain values, computation types, and impacted domain values. For example, a rule to compute impacting domain values may read: "IF there exists one path from RDO 1110 to RDO 1140 that includes edges with value "FULL" for property "originDomainUsage" (i.e., "originDomainUsage" 806, FIG. 8), THEN "impactingDomainValues" (RDO 1110, RDO 1140)= "FULL"; ELSE "impactingDomainValues" (RDO 1110, RDO 1140) +"PARTIAL".

Further, examples of rules to compute computation types include (assuming a path from the RDO 1110 to the RDO 1140 traverses a computation of type "set difference", a left non-commutative binary operator (not illustrated)): Rule 1—"IF each path of ALG.PATHS (RDO 1110, RDO 1140) traverses at least one left (resp. right) non-commutative binary attribute computation operation on its right (resp. left) side OR an attribute computation of type 'constant', THEN computation_type (RDO 1110, RDO 1140)=NONE"; Rule 2—"IF ALG.INTER_NODES (RDO 1110, RDO 1140) includes attribute computation nodes of type IDENTITY, or set operations (union, difference, intersection), THEN computation_type (RDO 1110, RDO 1140)=IDENTITY"; Rule 3—"IF ALG.INTER_NODES (RDO 1110, RDO 1140) includes attribute computation nodes of type IDENTITY, or set operations, and at least one node of type SCALAR, THEN computation_type (RDO 1110, RDO 1140)=SCALAR"; Rule 4—"IF the following conditions are true: 1. "ALG.INTER_NODES (RDO 1110, RDO 1140) includes attribute computation nodes of type IDENTITY or set operations or AGGREGATE or WINDOW or RESTRICTED_AGGREGATE, or SCALAR"; 2. "Each path of ALG.PATHS (RDO 1110, RDO 1140) traverses at least one attribute computation node of type AGGREGATE or WINDOW, or RESTRICTED_AGGREGATE"; 3. "For each node of type AGGREGATE or WINDOW or RESTRICTED_AGGREGATE in ALG. INTER_NODES (RDO 1110, RDO 1140), ALG.INTER_NODES (node type AGGRE- GATE, RDO 1140) does not contain any attribute computation node of type SCALAR", THEN computation_type (RDO 1110, RDO 1140)=SCALAR_AGG"; Rule 5—"IF the following conditions are true: 1. "ALG.INTER_NODES (RDO 1110, RDO 1140) includes attribute computation nodes of type IDENTITY or set operations or AGGREGATE or WINDOW or RESTRICTED_AGGREGATE, or SCALAR"; 2. "Each path of ALG.PATHS (RDO 1110, RDO 1140) traverses at least one attribute computation node of type AGGREGATE or WINDOW, or RESTRICTED_AGGREGATE"; 3. "For each node of type SCALAR in ALG. INTER_NODES (RDO 1110, RDO 1140), ALG.INTER_NODES (node of type SCALAR, RDO 1140) does not contain any attribute computation node of type AGGREGATE, WINDOW, or RESTRICTED_AGGREGATE", THEN computation_type (RDO 1110, RDO 1140)= AGG_SCALAR"; Rule 6—"IF the following conditions are true: 1. "ALG.INTER_NODES (RDO 1110, RDO 1140) includes attribute computation nodes of type IDENTITY or set operations or AGGREGATE or WINDOW, or RESTRICTED_AGGREGATE"; 2. "Each path of ALG. PATHS (RDO 1110, RDO 1140) traverses at least one attribute computation node with type AGGREGATE or WINDOW, or RESTRICTED_AGGREGATE", THEN computation_type (RDO 1110, RDO 1140)=AGG"; Rule 7: "computation_type (RDO 1110, RDO 1140)=COMPLEX in other cases". The rules may be applied in order (the first matching rule applies) to compute the computation type.

Moreover, examples of rules to compute impacted domain values may include: Rule 1—"IF there exists one path in ALG.PATHS (RDO 1110, RDO 1140) such that include with value "define" for the property "updateMode" (i.e., property "UpdateMode" 810, FIG. 8) and for each attribute lineage node of the path, one of the following conditions is true: 1. "ALG.IN_EDGES_NOTCOMING (lineage node of the path, RDO 1110) is empty"; 2. "The lineage node of the path is of type SCALAR"; 3. "The lineage node of the path is of type INTERSECT"; 4. "The lineage node of the path is a left non-commutative binary operator and ALG.IN_EDGES_NOTCOMING(lineage node of the path, RDO 1110) include the edge with the right argument of lineage node of the path", THEN ImpactedDomainValues(RDO 1110, RDO 1140)=FULL"; Rule 2 —"IF there exist one path in ALG. PATHS (RDO 1110, RDO 1140) such that the path includes edges with updateMode IN ('define', 'replace') and the path includes at least one edge with update mode='replace' and for each node in the path, one of the following conditions is true: 1. "The node is an attribute computation node of type UNION ALG.IN_EDGES_NOTCOMING (the node, RDO 1110) is empty"; 2. "The node is an attribute computation node of type SCALAR"; 3. "The node is an attribute computation node of type INTERSECT"; 4. "The node is an attribute computation node representing a left non-commutative binary operator and ALG.IN_EDGES_NOTCOMING (the node, RDO 1110) incldues the edge with the right argument of the node"; 5. "The node is an attribute node and both conditions are true: a. "ALG.IN_EDGES_COMING (the node, RDO 1110) includes edges with 'replace' update mode" and, b. "One of the following conditions are true: i. "ALG.IN_EDGES_NOTCOMING (the node, RDO 1110) is empty", ii. "For each edge in ALG.IN_EDGES_NOTCOMING (the node, RDO 1110), updateMode='replace' and Rule 1 or Rule 2 applies between RDO 1110 and origin edge", THEN ImpactedDomainValues(RDO 1110, RDO 1140)= 'FULL_OR_NOTHING'; Rule 3:—"ImpactedDomainValues(RDO 1110, RDO 1140)='PARTIAL' in other cases".

In one embodiment, an attribute level analysis view may be annotated with the computed summary information based on a propagation algorithm. The propagation algorithm may start from an attribute node, traverse the data lineage structure 1100 forward and apply propagation functions on descendant nodes and edges. Thus, each node of the data lineage structure 1100 which is not a table computation node may be annotated with summary information including "impactingDomainValues", "computation type", and "impactedDomainValues". The propagation functions may include mapping, reducing, and filtering functions, among others. The propagation functions may comply with the rules to compute the summary information. The propagation functions may be written in various programming languages and in accordance with various programming techniques.

An attribute level impact analysis view may be annotated in accordance with various strategies. For example, propagation functions may be applied over the attribute level impact analysis view based on one of the following strategies: (1) follow the topological order to limit the number of propagations to the size of the graph or (2) apply functions in any order until a fixed point in reached (parallel execution). In an exemplary embodiment, the following propagation functions are applied to calculate summary information to annotate the attribute level impact analysis view:

Preliminary functional notations:

In the following, MAP, REDUCE and FILTER functions are defined as follows. MAP (X, F) takes two arguments: X a list of objects, and F a unary function. It returns a collection computed as follows:

$$\text{var res=[]; for (var } i=0; i<X.\text{length}; i++) \text{ \{res.append}(F(X[i]))\text{ \}return res;}$$

REDUCE (X, F) takes two arguments: X a list of objects, and F a binary function. It returns a single value computed as follows:

$$\text{var res=}X[0]; \text{ for (var } i=0; i<X.\text{length}; i++)\{\text{res}=F(\text{res, } X[i])\text{ \}return res;}$$

FILTER (X, F) takes two arguments: X a list of objects, and F a Boolean unary function. It returns a collection computed as follows:

$$\text{var res=[]; for (var } i=0; i<X.\text{length}; i++)\{\text{if } (F(X[i])) \text{ then res.append}(X[i]); \text{ \}return res;}$$

A lambda-notation is utilized to pass functions as argument of MAP, REDUCE or FILTER. For instance, if F is a binary function notation is used: $(x, y) \Rightarrow F(x,y)$ to pass it as argument.

Propagation functions for impacting domain values:

Let FG the full lineage graph and let G be the subgraph of FG representing impact analysis view of attribute A. The annotation of impacting domain values is computed by applying the following functions on each descendant edge and node of A. Note: N.impactingDomainValues the value of impactingDomainValues(A,N).

Initialization:

$$A.\text{impactingDomainValues=FULL}$$

Propagation on edge:

Let "e" be an attribute lineage edge in G.DESC_EDGES (A) where destination node is not a table computation, then:
e.impactingDomainValues=DU_EDGE(e.origin.impactingDomainValues, e.originDomainUsage)

where DU_EDGE (X, Y) is defined using the following Table 1 (X argument is vertical):

TABLE 1

| DU_EDGE | FULL | PARTIAL |
|---|---|---|
| FULL | FULL | PARTIAL |
| PARTIAL | PARTIAL | PARTIAL |

Propagation on Node: let N be a node reachable from A other than a table computation node, then:

```
// impactingDomainValues(A,N) is FULL if at least one incoming
edge from A is FULL. By
// definition of impact analysis view, each incoming edge into
N is a descendent edge of A. N.impactingDomainvalues =
   REDUCE(G.IN_EDGES(N),
```

-continued

```
    (e1,e2) => MERGE_ING(e1.impactingDomainValues,
        e2.impactingDomainValues)
    )
``` where MERGE_ING (X, Y) is defined using the following Table 2 (X argument is vertical):

TABLE 2

| DU_EDGE | FULL | PARTIAL |
|---|---|---|
| FULL | FULL | FULL |
| PARTIAL | FULL | PARTIAL |

Propagation functions for computation type:
Let G be the graph of the impact analysis view of attribute A. The annotation of computation type is obtained by applying the following functions on each descendant edge and node of A. Note: N.computationType the value of computationType (A,N).
Initialization:

A.computationType=IDENTITY

Propagation on edge:
Let "e" be an attribute lineage edge in G.DESC_EDGES (A) where destination node is not a table computation, then:

e.computationType=e.origin.computationType

Propagation on Node:
Let N be a left non-commutative binary attribute computation node, then:

```
// Function isLeftSide(e) is true when property e.isLeftSide is
true and false otherwise.
// computationType(A,N) is 'NONE' when left argument of N
is not a descendant node of A. N.computationType =
    CASE
    WHEN FILTER(G.IN_EDGES(N), e=> isleftSide(e)) = Ø
    THEN 'NONE'
    ELSE FILTER(G.IN_EDGES(N), e=>
    isleftSide(e))[0].computationType END
```

Let N be an attribute computation node of type Union, Intersection or Identity, then:

```
// incoming edges to N that are descendent edges of A are merged
N.computationType =
    REDUCE(G.IN_EDGES(N),
        (e1,e2) => MERGE_C(e1.computationType,
        e2.computationType))
```

Where MERGE_C (X,Y) is defined as follows in Table 3 for values of X and Y other than 'COMPLEX' and is equal to 'COMPLEX' when either X or Y has value 'COMPLEX':

TABLE 3

| MERGE_C | NONE | IDENTITY | SCALAR | AGG | AGG_SCALAR | SCALAR_AGG |
|---|---|---|---|---|---|---|
| NONE | NONE | IDENTITY | SCALAR | AGG | AGG_SCALAR | SCALAR_AGG |
| IDENTITY | IDENTITY | IDENTITY | SCALAR | COMPLEX | COMPLEX | COMPLEX |
| SCALAR | SCALAR | SCALAR | SCALAR | COMPLEX | COMPLEX | COMPLEX |
| AGG | AGG | COMPLEX | COMPLEX | AGG | AGG_SCALAR | SCALAR_AGG |
| SCALAR_AGG | SCALAR_AGG | COMPLEX | COMPLEX | SCALAR_AGG | COMPLEX | SCALAR_AGG |
| AGG_SCALAR | AGG_SCALAR | COMPLEX | COMPLEX | AGG_SCALAR | AGG_SCALAR | COMPLEX |

Let N be an attribute computation node of type AGGREGATE, WINDOW or RESTRICTED AGGREGATE, then:

```
// By definition there is no other incoming edge in N
than the one visited from A N.computationType=
    MAP(G.IN_EDGES(N),
        e => M2AGG(e.computationType))[0]
```

Where M2AGG (X) is defined as follows in Table 4:

TABLE 4

| | M2AGG |
|---|---|
| NONE | NONE |
| IDENTITY | AGG |
| SCALAR | SCALAR_AGG |
| AGG | AGG |
| AGG_SCALAR | COMPLEX |
| SCALAR_AGG | SCALAR_AGG |
| COMPLEX | COMPLEX |

Let N be an attribute computation node of type SCALAR, then:

```
N.computationType=
// incoming edges to N that are descendent edges of A are considered.
Computation is
// done in two steps:
    REDUCE(MAP(G.IN_EDGES(N),
// 1. Computation type of each incoming edge is mapped to a scalar-like
type if possible
    e => M2SCALAR(e.computationType)),
// 2. Computation types of incoming edges are merged
    (e1,e2) => MERGE_C (e1.computationType, e2.computationType)
    )
```

Where M2SCALAR (X) is defined as follows in Table 5 and MERGE_C is as before:

TABLE 5

| M2SCALAR | |
|---|---|
| NONE | NONE |
| IDENTITY | SCALAR |
| SCALAR | SCALAR |
| AGG | AGG_SCALAR |
| AGG_SCALAR | AGG_SCALAR |
| SCALAR_AGG | COMPLEX |
| COMPLEX | COMPLEX |

Let N be an attribute node of a source dataset table, remote dataset table or parameter, then:

N.computationType =
    REDUCE(G.IN_EDGES(N),
      (e1,e2) => MERGE_C(e1.computationType, e2.computationType)

For other types of nodes, except attribute table computation nodes:

N.computationType=COMPLEX

Propagation functions for impacted domain values

Let FG the full lineage graph and let G be the subgraph of FG representing impact analysis view of attribute A. The annotation of impacted domain values impactedDomainValues (A,N) for a node N is computed by applying the following functions on each descendant edge and node of A. Note: N.impactedDomainValues the value of impactedDomainValues (A,N).

Initialization:

A.impactedDomainValues=FULL

Propagation on edge:

Let "e" be an attribute lineage edge where destination node is not a table computation, then:

// The proportion of values of e.origin that depend on values of
A are propagated to
// e.destination with an effect influenced by the update mode of the
attribute lineage edge
e.impactedDomainValues =
    UM_EDGE(e.origin.impactedDomainValues, e.updateMode)

where UM_EDGE (X, Y) is defined as follows in Table 6:

TABLE 6

| UM_EDGE | define/replace | update/upsert/append/delete |
|---|---|---|
| FULL | FULL | PARTIAL |
| PARTIAL | PARTIAL | PARTIAL |
| FULL_OR_NOTHING | FULL_OR_NOTHING | PARTIAL |

Propagation on node:

Let N be an attribute node of a source dataset table, remote dataset table or parameter, then:

```
// propagation is done in two steps:
N.impactedDomainValues =
    REDUCE (MAP(G.IN_EDGES(N),
// 1. the impactedDomainValues of each incoming edge is affected by the update mode of
// concurrent edges that are not descendent edges of A (so not in the analysis graph)
        e=> REDUCE(append[e, FG.IN_EDGES_NOTCOMING(N,A)],
            (e1,e2) => U_EFFECT(e1.impactedDomainValues,
                e2.updateMode)
            )),
// 2. the affected impactedDomainValues of concurrent descendent edges of A are merged
        (e1,e2) => MERGE_ATT(e1,e2)
        )
```

U_EFFECT computes the effect of a concurrent update mode on the impactedDomainValues of an edge. By definition, note that there cannot be concurrent edges with a "define" update mode. U_EFFECT is define as follows in Table 7:

TABLE 7

| UM_EFFECT | define/replace | update/upsert/append/delete |
|---|---|---|
| FULL | FULL_OR_NOTHING | PARTIAL |
| PARTIAL | PARTIAL | PARTIAL |
| FULL_OR_NOTHING | FULL_OR_NOTHING | PARTIAL |

MERGE_ATT computes the merged value of the impactedDomainValues of two concurrent edges. MERGE_ATT is defined as follows in Table 8:

TABLE 8

| MERGE_ATT | FULL | PARTIAL | FULL_OR_NOTHING |
|---|---|---|---|
| FULL | FULL | FULL | FULL |
| PARTIAL | FULL | PARTIAL | PARTIAL |
| FULL_OR_NOTHING | FULL | PARTIAL | FULL_OR_NOTHING |

Let N be an attribute computation node of type Union, then:

```
    N.impactedDomainValues =
// when there is no incoming edge to N that is not a descendent edge of A (these edges are
// not in the analysis graph), concurrent incoming edges are merged
    CASE WHEN (FG.IN_EDGES_NOTCOMING(N,A)) = Ø
        THEN REDUCE(G.IN_EDGES(N),
            (e1,e2) => MERGE_UNION (e1.impactedDomainValues,
                                    e2.impactedDomainValues))
// otherwise there can be a concurrent edge that is not a descendent edge of A, so //
contribution of A can be partial
        ELSE 'PARTIAL'
    END
```

Where MERGE_UNION compute the effect of having attribute A contributing to the Union through two concurrent execution paths. MERGE_UNION is defined as follows in Table 9:

TABLE 9

| MERGE_UNION | FULL | PARTIAL | FULL_OR_NOTHING |
|---|---|---|---|
| FULL | FULL | PARTIAL | PARTIAL |
| PARTIAL | PARTIAL | PARTIAL | PARTIAL |
| FULL_OR_NOTHING | PARTIAL | PARTIAL | PARTIAL |

Let N be an attribute computation node of type Intersection, then:

```
    N.impactedDomainValues =
// By property of intersection, it is sufficient to consider incoming edges
    REDUCE(G.IN_EDGES(N),
        (e1,e2) = >MERGE_INTER(e1.impactedDomainValues,
                                e2.impactedDomainValues)
    )
```

Where MERGE_INTER is defined as follows in Table 10. A single edge with value 'FULL' is sufficient to get a resulting 'FULL' value.

TABLE 10

| MERGE_INTER | FULL | PARTIAL | FULL_OR_NOTHING |
|---|---|---|---|
| FULL | FULL | FULL | FULL |
| PARTIAL | FULL | PARTIAL | PARTIAL |
| FULL_OR_NOTHING | FULL | PARTIAL | FULL_OR_NOTHING |

Let N be a left non-commutative binary attribute computation node, then:

```
N.impactedDomainValues =
// value is 'NONE' when left argument of N is not a descendant node of A
    CASE WHEN FILTER(G.IN_EDGES(N), e=> isleftSide(e)) = Ø)
    THEN 'NONE'
    ELSE FILTER(G.IN_EDGES(N), e=>
isleftSide(e))[0].impactedDomainValues
    END
```

Let N be a computation node that is neither a left non-commutative binary attribute computation node, nor a union, nor an intersection node, then:

```
N.impactedDomainValues =
    REDUCE(G.IN_EDGES(N),
        (e1,e2) => MERGE_OTHER(e1.impactedDomainValues,
                                e2.impactedDomainValues)
    )
```

Where MERGE_OTHER computes the merge of the impactedDomainValues of two concurrent input parameters. If values of some input parameter depend on values of A then the result of the attribute computation node depends on values of A. MERGE_OTHER is defined as follows in Table 11:

TABLE 11

| MERGE_OTHER | FULL | PARTIAL | FULL_OR_NOTHING |
|---|---|---|---|
| FULL | FULL | FULL | FULL |
| PARTIAL | FULL | PARTIAL | PARTIAL |
| FULL_OR_NOTHING | FULL | PARTIAL | FULL_OR_NOTHING |

FIG. 12 illustrates an exemplary dataset represented as a number of dataset tables, according to one embodiment. FIG. 12 includes an XML FILE 1210, a dataset table STORE 1220, and a dataset table SALE 1240. The dataset table STORE 1220 and the dataset table SALE 1240 are table representations of parts of the XML FILE 1210. In one embodiment, the dataset tables refer to specific components of the dataset. Components of the dataset include sets of elements of the XML FILE 1210. For example, the dataset table STORE 1220 refers to elements "/sales/store" and the dataset table SALE 1240 refers to elements "/sales/store/sales". Similarly, a column of a dataset table refers to a particular component of the dataset (e.g., an attribute of elements of the XML FILE 1210). For example, columns "storeRef" 1222 and 1242 of the dataset tables STORE 1220 and SALE 1240, respectively, refer to attribute "/sales/store@storeRef" of the XML FILE 1210. Additionally, columns "storeName" 1224, "storeType" 1226, "State" 1228, "Zip" 1230, "City" 1232, and "Country" 1234 of the dataset table STORE 1220 refer to attributes "/sales/store@storeName", "/sales/store@storeType", "/sales/store@State", "/sales/store@Zip", "/sales/store@City", and "/sales/store@Country" of the XML FILE 1210, respectively. Further, columns "unitPrice" 1244, "productReference" 1246, "Date" 1248, and "Quantity" 1252 of the dataset table "SALE" 1240 refer to attributes "/sales/store/sales@unitPrice", "/sales/store/sales@productReference", "/sales/store/sales @Date", and "/sales/store/sales @Quantity" of the XML FILE 1210, respectively.

FIG. 13 illustrates an exemplary computation specification 1300, according to one embodiment. The exemplary computation specification 1300 may be extracted from the DSS 335 by the data source extractor 325, FIG. 3. The exemplary computation specification 1300 is an SQL query. The data source extractor 325 may extract data lineage information from the SQL query 1300 in the form of a computation node graph (e.g., computation node graph 320, FIG. 3). To extract the computation node graph 320, the data source extractor 325 translates input and output datasets of the computation specification 1300 into source dataset tables (e.g., as described above with reference to FIG. 12). When the input and output datasets are translated into source dataset tables, the data source extractor 325 generates a transformation node for a "SELECT" statement in the exemplary computation specification 1300. The transformation node defines a mapping between the input and the output source dataset tables. When the transformation node is generated, content of the "SELECT" statement is analyzed to define types of attribute or table computations to be included within the transformation node.

Figure 14:
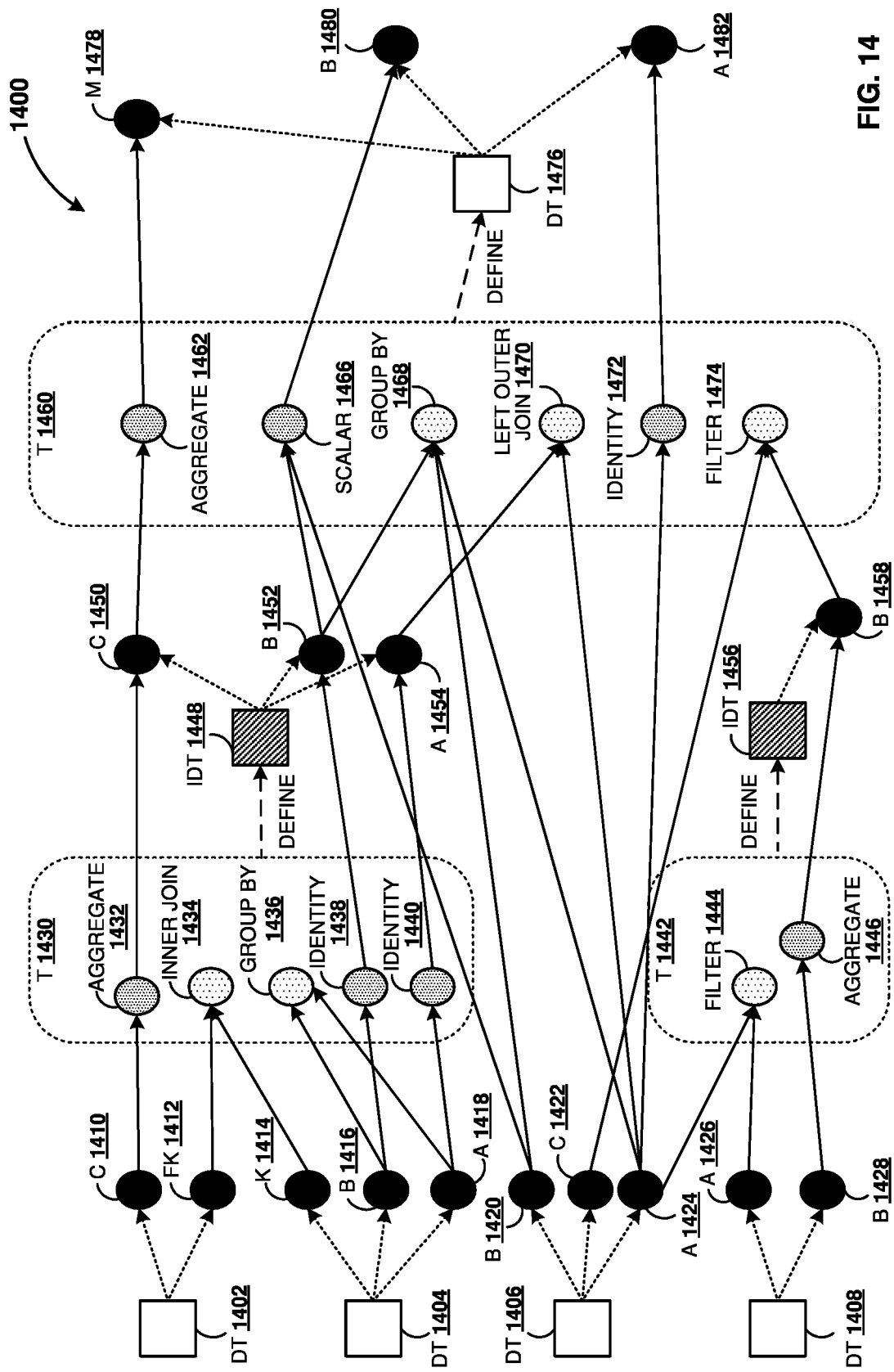
FIG. 14 illustrates an exemplary computation node graph, according to one embodiment.

FIG. 14 illustrates an exemplary computation node graph 1400, according to one embodiment. The exemplary computation node graph 1400 is generated based on the exemplary computation specification 1300, FIG. 13, and in accordance with the attribute level lineage model illustrated by the UML class diagram 600, FIG. 6. The exemplary computation node graph 1400 is a data structure that describes relationships between datasets and transformation operations applied on datasets to calculate child datasets. The exemplary computation node graph 1400 includes nodes representing datasets (or dataset tables associated with the datasets) and transformation operations, and edges interconnecting the nodes. Computation node graphs may be extracted from computation specifications or dataset metadata.

In one embodiment, the exemplary computation node graph 1400 describes relationships between datasets with attribute level granularity. The exemplary computation node graph 1400 includes dataset table (DT) 1402, DT 1404, DT 1406, and DT 1408 that are input dataset tables for the computation specification 1300, FIG. 13. For example, the DT 1402 is a source dataset table corresponding to the dataset "S20" that is specified in the exemplary computation specification 1300 as an input dataset. Similarly, the DT 1404 is a source dataset table corresponding to the dataset "S4", the DT 1406 is a source dataset table corresponding to the dataset "S10", the DT 1408 is a source dataset table corresponding to the dataset "S3" that are specified in the exemplary computation specification 1300 as input datasets. Further, the exemplary computation node graph includes attributes "C" 1410 and "FK" 1412 of the DT 1402, attributes "K" 1414, "B" 1416, and "A" 1418 of the DT 1404, attributes "B" 1420, "C" 1422, and "A" 1424 of the DT 1406, and attributes "A" 1426 and "B" 1428 of the DT 1408. The exemplary computation node graph 1400 defines lineage relationship between attributes of the input datasets and attributes "M" 1478, "B" 1480, and "A" 1482 of DT 1476 that is an output dataset for the exemplary computation node graph 1400. The dataset table DT 1476 is a source dataset table corresponding to the dataset "S7" specified as an output dataset in the exemplary computation specification 1300. In addition, the exemplary computation node graph 1400 includes internal dataset table (IDT) 1448 and IDT 1456 that capture intermediate values of the computation of the attributes of the output dataset DT 1476.

In one embodiment, the exemplary computation node graph 1400 includes transformation nodes T 1430, T 1442, and T 1460. A transformation node is generated for a "SELECT" statement of the exemplary computation specification 1300, FIG. 13. Transformation nodes are created in accordance with the transform operation 644 described above with reference to the computation node graph metadata model. FIG. 6. The transformation node 1430 corresponds to a "SELECT" statement starting at line 9 of the exemplary computation specification 1300. Similarly, the transformation node T 1442 corresponds to a "SELECT" statement starting at line 23 of the exemplary computation specification 1300 and the transformation node T 1460 corresponds to a "SELECT" statement starting at line 2 of the exemplary computation specification 1300.

When the transformation nodes T 1430, T 1442, and T 1460 are created, contents of corresponding "SELECT" statements are analyzed to define types of attribute and/or table computations to be included in the transformation nodes T 1430, T 1442, and T 1460. For example, based on the analysis, the transformation node 1430 includes attribute computation nodes "AGGREGATE" 1432, "IDENTITY" 1438, and "IDENTITY" 1440, and table computation nodes "INNER JOIN" 1434 and "GROUP BY" 1436.

In one embodiment, the attribute computation nodes are generated based on a type of the attribute computation. The type of the attribute computation is defined by the value of property "type" 662 of the attribute computation 658, FIG. 6. When each output attribute value is generated by applying an identity function to a value of a single input attribute, the value of the property "type" 662 is "identity". Thus, the attribute computation node "IDENTITY" 1440 is generated for the attribute "A" 1418 based on line 10 of the exemplary computation specification 1300, and the attribute computation node "IDENTITY" 1438 is generated for the attribute "B" 1416 based on line 11 of the exemplary computation specification 1300. When each output attribute value is computed from of an aggregate function applied over a set of values of a single input attribute, the value of the property "type" 662 is "aggregate". Thus, the attribute computation node "AGGREGATE" 1432 is generated for the attribute "C" 1410 based on line 12 of the exemplary computation specification 1300.

In one embodiment, the table computation nodes are generated based on type of table computation. For example, the table computation node "INNER JOIN" 1434 is generated based on line 14 of the exemplary computation specification 1300, and the table computation node "GROUP BY" 1436 is generated based on line 15 of the exemplary computation specification 1300.

Similarly, the transformation node 1442 includes table computation node "FILTER" 1444 generated based on line 22 of the exemplary computation specification, and an attribute computation node "AGGREGATE" 1446 generated based on line 20 of the exemplary computation specification 1300. Further, the transformation node T 1460 includes attribute computation nodes "AGGREGATE" 1462 (generated based on line 5 of the exemplary computation specification 1300), "IDENTITY" 1472 (generated based on line 3 of the exemplary computation specification 1300), and "SCALAR" 1464 (generated based on line 4 of the exemplary computation specification). Attribute computation nodes that have value "scalar" of the property "type" 662 are generated when each output attribute value is computed by an "n-ary" scalar function where each argument of the function is a value coming from an input attribute. The transformation node T 1460 also includes table computation nodes "GROUP BY" 1468 (generated based on line 24 of the exemplary computation specification 1300), "LEFT OUTER JOIN" 1470 (generated based on lines 8 and 17 of the exemplary computation specification 1300), and "FILTER" 1474 (generated based on lines 18 and 19 of the exemplary computation specification 1300).

Figure 15:
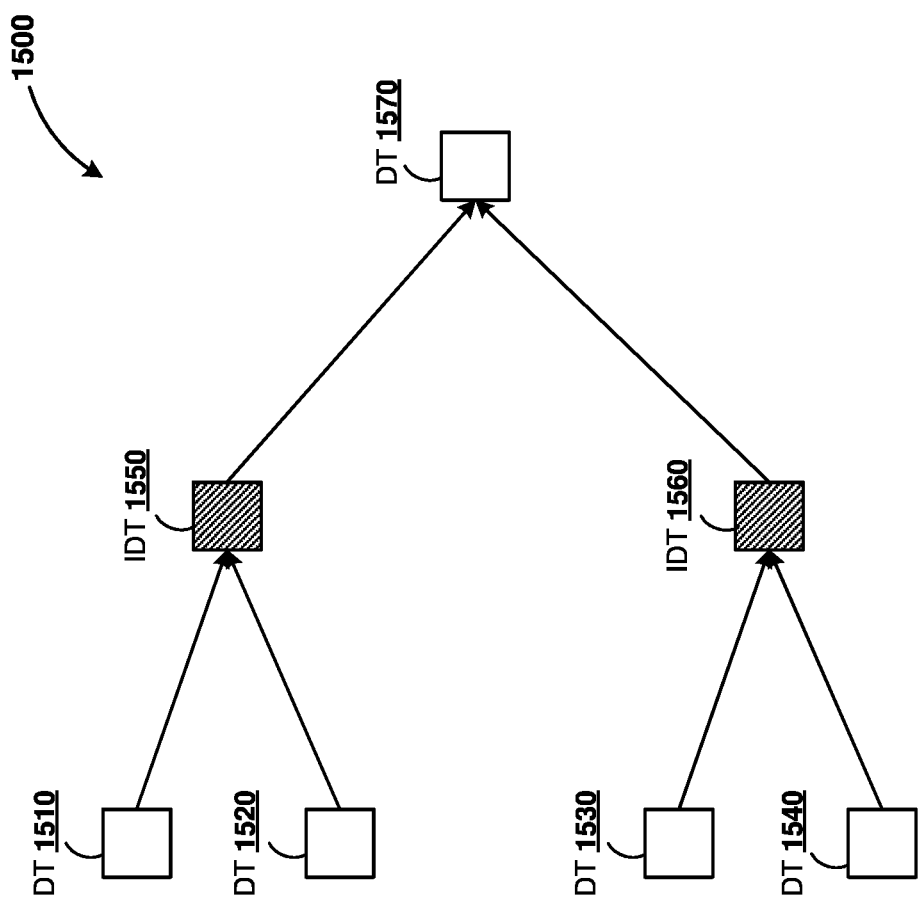
FIG. 15 illustrates an exemplary dataset level lineage graph, according to one embodiment.

FIG. 15 illustrates an exemplary dataset level lineage graph 1500, according to one embodiment. The dataset level lineage graph 1500 is generated based on the exemplary computation node graph 1400, FIG. 14. The dataset level lineage graph 1500 is generated by the data lineage loader 355, FIG. 3, when the exemplary computation node graph 1400 is loaded into the data lineage storage 360, FIG. 3. The dataset level lineage graph 1500 includes dataset tables DT 1510, DT 1520, DT 1530, DT 1540, DT 1570, and intermediate dataset tables IDT 1550 and IDT 1560, that refer to DT 1402, DT 1404, DT 1406, DT 1408, DT 1476, and intermediate dataset tables IDT 1448 and IDT 1456 of the exemplary computation node graph 1400, respectively. In one embodiment, the exemplary dataset lineage graph 1500 is generated by creating a dataset lineage edge between an input and output dataset of the transformation operations T 1430, T 1442, and T 1460, FIG. 14.

Figure 16:
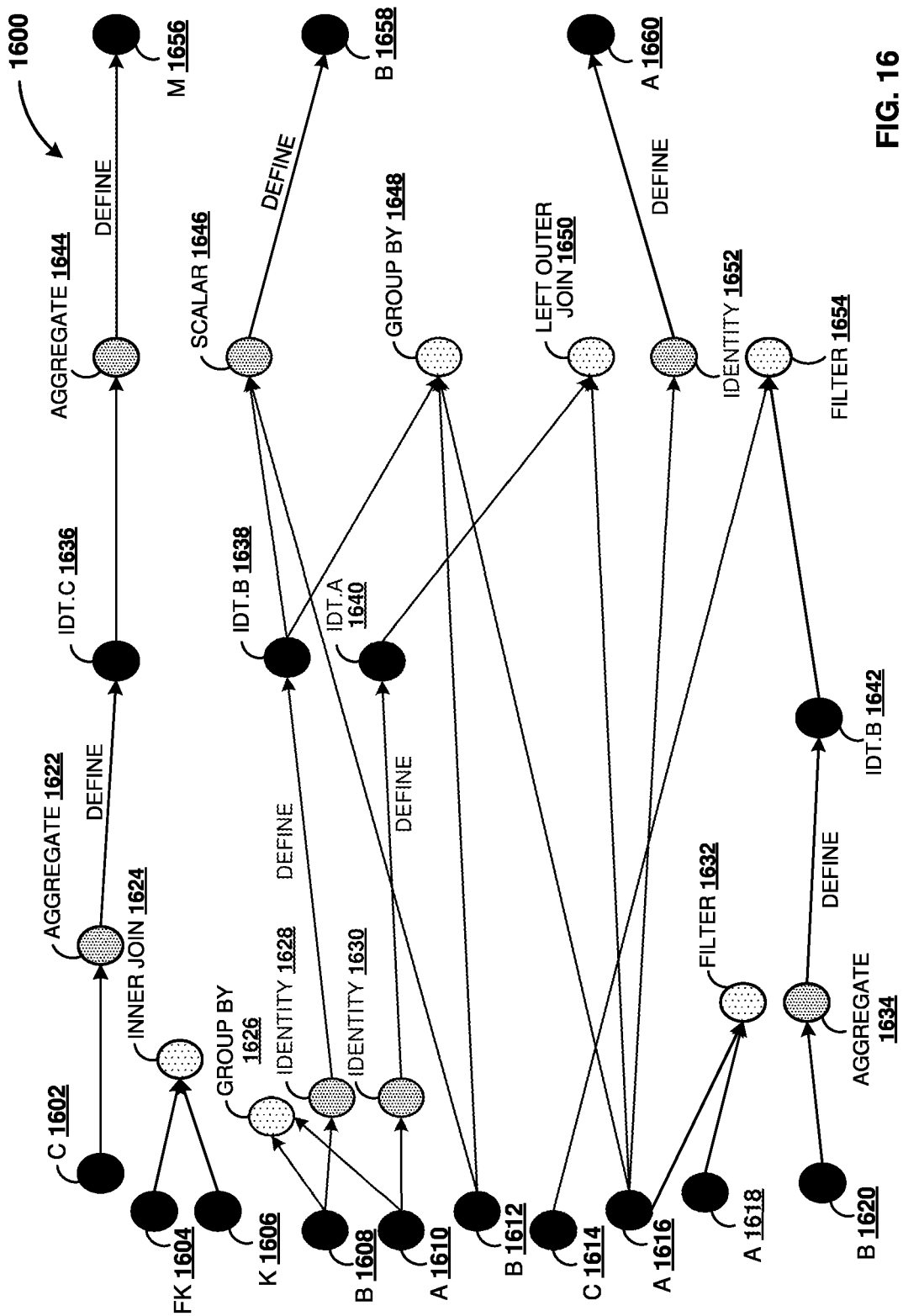
FIG. 16 illustrates an exemplary attribute level lineage graph, according to one embodiment.

FIG. 16 illustrates an exemplary attribute level lineage graph 1600, according to one embodiment. The attribute level lineage graph 1600 is generated based on the exemplary computation node graph 1400, FIG. 14. The attribute level lineage graph is generated by the data lineage loader 355 when the exemplary computation node graph 1400 is loaded into the data lineage storage 360. The attribute level lineage graph is generated by creating an attribute lineage edge for a lineage edge that connects an attribute node (e.g., "C" 1410, "FK" 1412, "K" 1414, "B" 1416, "A" 1418, etc.) with another node of the exemplary computation node graph 1400. When destination of a lineage edge (LE) of the exemplary computation node graph 1400 is a table or a computation node, origin and destination nodes of the attribute lineage edge to be created within the attribute level lineage graph 1600 are inherited from the LE. For example, attribute lineage edges are created between the attributes "C" 1602, "FK" 1604, "K" 1606, "B" 1608, "A" 1610, "B" 1612, "C" 1614, "A" 1616, "A" 1618, "B" 1620 and corresponding computation nodes "AGGREGATE" 1622, "INNER JOIN" 1624, "GROUP BY" 1626, "IDENTITY" 1628, "IDENTITY" 1630, "FILTER" 1632, and "AGGREGATE" 1634 that are the destination nodes of the attribute lineage edges. Similarly, attribute lineage edges created among other attribute and computation nodes of the attribute level lineage graph 1600 are inherited from the exemplary computation node graph 1400.

In addition, value of the "UpdateMode" property (property "UpdateMode" 810, FIG. 8) is set to "define". The value of the property "UpdateMode" indicates impact that the values of an origin node have on the values of a destination node. Values of the properties "alias" ("alias" 808, FIG. 8) and "isLeftSide" ("isLeftSide" 812, FIG. 8) are also inherited from the exemplary computation node graph 1400. In one embodiment, value of the property "originDomainUsage" ("originDomainUsage" 806, FIG. 8) is calculated based on a domain usage algorithm including the following steps: step 1: If the transformation node includes a table computation of type 'Other' then return "PARTIAL"; step 2: If the transformation node includes a table computation that filters values of origin nodes then return "PARTIAL"; step 3: If the transformation node includes a single table computation of type LEFT (resp. RIGHT) OUTER JOIN and the attribute lineage edge origin is an attribute node of the right (resp. left) side then return "PARTIAL". If the transformation node includes several LEFT OUTER JOIN table computation nodes, then return "PARTIAL; step 4: return "FULL" for other cases. In one embodiment, the value of the "originDomainUsage" is "full" when the whole domain of values of the origin node contributes to the domain of values of the destination node. Similarly, the value of the "originDomainUsage" is "partial" when a subset of the domain of values of the origin node contributes to the domain of values of the destination node.

As another example, when destination of LE is an attribute node of an output dataset node of the transformation node linked to the transformation node through an update edge, the origin and destination of the attribute lineage edge are inherited from the origin and destination of the LE. Further, value of the "UpdateMode" property is inherited from the update mode of the update edge, values of the properties "alias" and "isLeftSide" are undefined, and value of the property "originDomainUsage" is "FULL".

Figure 17:
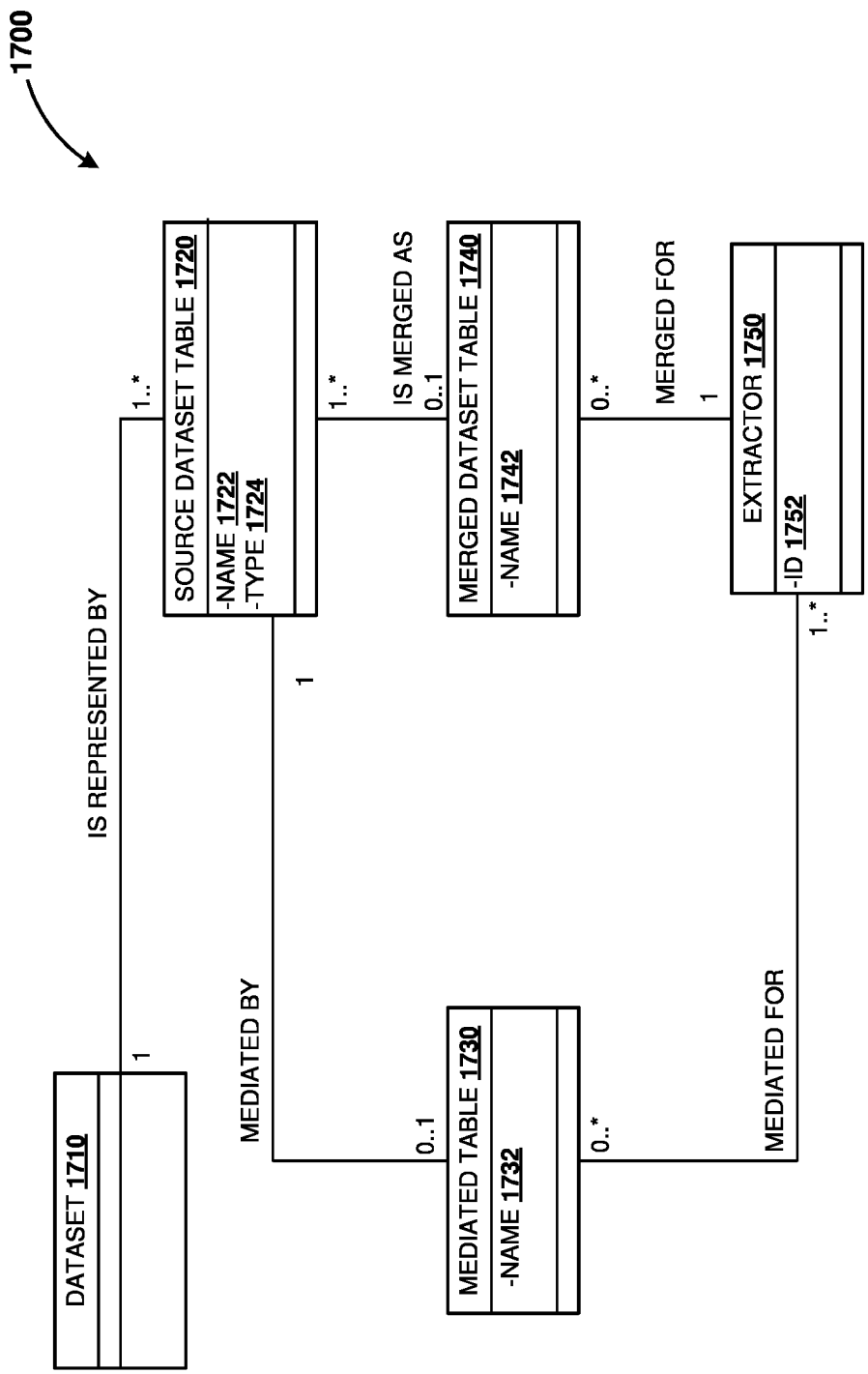
FIG. 17 is a UML class diagram illustrating relationships between datasets, source dataset tables, mediated tables, merged dataset tables, and extractors, according to one embodiment.

FIG. 17 is a UML class diagram 1700 illustrating relationships between a dataset 1710, a source dataset table 1720, a mediated table 1730, a merged dataset table 1740, and an extractor 1750, according to one embodiment. Different extractors may create different table representations of the dataset 1710 in accordance with various known mapping algorithms. Therefore, source dataset tables created by different extractors as table based representations of the dataset 1710 may be different. Tables that represent datasets include a reference to a corresponding part of the dataset that is represented, and for an attribute, a reference to the component of the dataset that is represented. For example, the XML FILE 1210, FIG. 12, may be decomposed into the source dataset tables STORE 1220 and SALE 1240 by the extractor 1750. The source dataset table STORE 1220 refers to the component "/sales/store" of the XML FILE 1210, and column "storeRef" 1222 refers to component "/sales/store@storeRef" of the XML FILE 1210. If another extractor maps the XML FILE 1210 into a single source dataset table SALES that flattens the representation of XML elements in the XML FILE 1210, the single table may refer to the top element "/sales" of the XML FILE 1210 and there may be a column in the single table referring to the component "/sales/store@storeRef".

In one embodiment, a computation specification "Cl" produces the XML FILE 1210 and a computation specification "C 2 " in another system consumes the XML FILE 1210. An extracted computation node graph "CN 1 " from "Cl" has for output the SALES representation of the file, and an extracted computation node graph "CN 2 " from "C 2 " has for input the STORE representation of the file, and for output a source dataset table "T". To provide exhaustive lineage information for "T", the STORE table and attributes are related to the SALES table and attributes.

In one embodiment, a computation specification "C 3 " consumes the XML FILE 1210. The corresponding extracted computation node graph "CN 3 " has SALES table representation for input and "T" as an output table. To trace the lineage of "T", it has to be detected that tables SALES and STORE are related to ensure that the input of "CN2 " may also be considered for the lineage of "T". Therefore, a mediated table-based representation (mediated table 1730) of the dataset 1710 is built to address the problem. The mediated table 1730 is a "hub" that relates alternative table-based representations. The mediated table 1730 consists of a single source dataset table. The mediated table 1730 has a property "name" 1732. The data lineage storage 355, FIG. 3, relates, based on the mediated table 1730, source dataset tables depending on whether they represent an input or output of a computation node graph. Mediated tables are stored in the data lineage storage 355.

In one embodiment, the mediated table 1730 is built by taking attributes of tables of a first set of merged source dataset tables (such as the merged dataset table 1740) for the dataset 1710 by the extractor 1750 and a set of merged source dataset tables (not illustrated) for the dataset 1710 by another extractor (not illustrated) and building a graph of containment relationships (not illustrated) based on the references to dataset components of an attribute. This way, an arc is created from one attribute to another if the reference of the first attribute is included in the reference of the second attribute (i.e., the first attribute refers to a subpart of the reference of the second attribute). Source attributes of the graph are added to the mediated table 1730 with corresponding references.

In one embodiment, the lineage relationships between the set of merged source dataset tables such as the source dataset table 1720 and the mediated table 1730 is as follows in Table 12 below:

TABLE 12

"for each table "T" of the first set of merged source dataset tables do
If T is an input table of CN then
for each attribute A of T do
If there exists an attribute B in MT such that B.ref = A.ref
then add an attribute computation node of type IDENTITY from B to A;
else If there exists an attribute B in MT such that B.ref is contained in A.ref
then if there exists an attribute set computation node with input B
then add a lineage edge from that node to A
else add an attribute set computation node from B to A;
Else
for each attribute A of T do
If there exists an attribute B in MT such that B.ref = A.ref
then add an attribute computation node of type IDENTITY from A to B;
else If there exists an attribute B in MT such that B.ref is contained in A.ref
then if there exists an attribute set computation node with input A
then add a lineage edge from that node to B
else add an attribute set computation node from B to A;"

Described is a system that provides comprehensive lineage information for datasets across a network of heterogeneous systems. The lineage information is extracted from data source systems and metadata repository systems by extractors in the form of computation node graphs. The extractors are dedicated to the systems based on system type. For example, there is at least one extractor dedicated for the data source systems and at least one extractor dedicated for the metadata repository systems. The extractors connect to the data source systems and the metadata repository systems through data connections and metadata connections. The data and metadata connections have different credentials. The lineage extractors may access the data and the lineage information at the DSSs based on privileges defined by the credentials of the connections. The datasets are translated into source dataset tables that store data from the datasets, the data accessible based on the credentials of the connections. The source dataset tables are stored at a storage. Source dataset tables, that correspond to one dataset and are extracted by one extractor through different connections, are automatically merged together to create merged dataset tables. The merged dataset tables include data from corresponding datasets that are accessible through a number of connections with different credentials. Based on references to attributes of the datasets, the merged dataset tables are related to source dataset tables that refer to the attributes of the datasets but are extracted by different extractors. Thus, detailed lineage information from various systems is provided for a dataset. The computation node graphs are loaded in the storage by a data lineage loader that generates dataset level and attribute level lineage graphs based on the computation node graphs. Upon a request to provide lineage information for a data object that corresponds to a related source dataset table, a data structure is generated based on the dataset lineage graphs, the attribute lineage graphs, and the related source dataset tables. The data structure defines relationships between the data object and one or more data objects associated with one or more child or parent datasets of the dataset. The data structure provides access to data of the dataset and data of the one or more child of parent datasets.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 18:
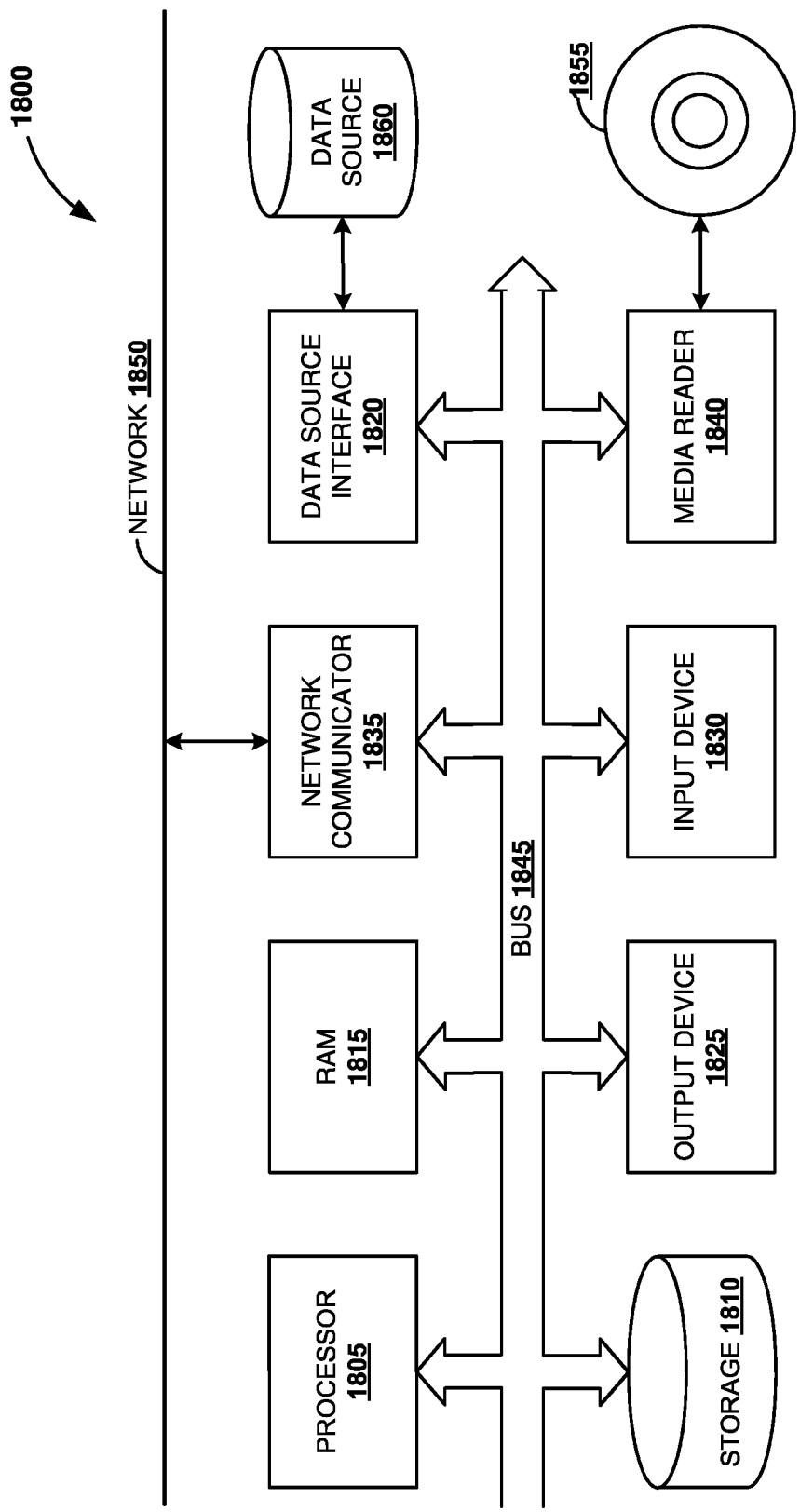
FIG. 18 is a block diagram of an exemplary computer system, according to one embodiment.

FIG. 18 is a block diagram of an exemplary computer system 1800. The computer system 1800 includes a processor 1805 that executes software instructions or code stored on a computer readable storage medium 1855 to perform the above-illustrated methods. The processor 1805 can include a plurality of cores. The computer system 1800 includes a media reader 1840 to read the instructions from the computer readable storage medium 1855 and store the instructions in storage 1810 or in random access memory (RAM) 1815. The storage 1810 provides a large space for keeping static data where at least some instructions could be stored for later execution. According to some embodiments, such as some in-memory computing system embodiments, the RAM 1815 can have sufficient storage capacity to store much of the data required for processing in the RAM 1815 instead of in the storage 1810. In some embodiments, all of the data required for processing may be stored in the RAM 1815. The stored instructions may be further compiled to generate other representations of the instructions and dynamically stored in the RAM 1815. The processor 1805 reads instructions from the RAM 1815 and performs actions as instructed. According to one embodiment, the computer system 1800 further includes an output device 1825 (e.g., a display) to provide at least some of the results of the execution as output including, but not limited to, visual information to users and an input device 1830 to provide a user or another device with means for entering data and/or otherwise interact with the computer system 1800. Each of these output devices 1825 and input devices 1830 could be joined by one or more additional peripherals to further expand the capabilities of the computer system 1800. A network communicator 1835 may be provided to connect the computer system 1800 to a network 1850 and in turn to other devices connected to the network 1850 including other clients, servers, data stores, and interfaces, for instance. The modules of the computer system 1800 are interconnected via a bus 1845. Computer system 1800 includes a data source interface 1820 to access data source 1860. The data source 1860 can be accessed via one or more abstraction layers implemented in hardware or software. For example, the data source 1860 may be accessed by network 1850. In some embodiments, the data source 1860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
    generating a dataset by applying one or more transformation operations to the dataset of a plurality of datasets stored at a data source system (DSS);
    generating a plurality of lineage graphs corresponding to a plurality of data objects, wherein data at a data object of the plurality of data objects is included in a source dataset table of a plurality of source dataset tables stored at a data lineage server (DLS), and wherein the data object represents the dataset of the plurality of datasets;
    determining, from the plurality of lineage graphs, a lineage graph corresponding to the dataset; and
    based on the lineage graph, generating one or more data lineage structures that define relationships between the data object and one or more data objects corresponding to one or more parent and child datasets of the dataset, wherein the one or more data lineage structures comprise data from the dataset and from the one or more parent and child datasets, wherein metadata defines how the dataset is computed from the parent dataset and how the child dataset is computed from the dataset.

2. The method of claim 1, wherein the lineage graph is generated to include a plurality of edges and a plurality of nodes, wherein the plurality of nodes comprises a node referring to the source dataset table, one or more nodes referring to one or more source dataset tables corresponding to the one or more datasets, and one or more transformation nodes referring one or more transformation operations applied to the one or more datasets to generate the dataset.

3. The method of claim 2, wherein generation of the lineage graph comprises:
    accessing a computation specification of a plurality of computation specifications, wherein the computation specification is associated with the dataset at the DSS;
    for a transformation operation identified in the computation specification:
        identifying one or more statements in the transformation operation;
        generating a transformation node corresponding to the transformation operation, wherein the transformation node comprises one or more attribute computation nodes, and wherein an attribute computation node of the one or more attribute computation nodes comprises a statement of the one or more statements; and
        creating a mapping between a column of an input source dataset table associated with a parent dataset of the one or more datasets, the attribute computation node, and the column of the source dataset table, wherein the column of the input source dataset table corresponds to a component of the parent dataset, and wherein the component of the dataset is computed by applying the statement on the component of the parent dataset; and for the computation specification, generating a computation node graph comprising a plurality of attribute nodes, one or more transformation nodes, and a plurality of edges, wherein the plurality of attribute nodes comprises an origin attribute node representing the column of the input source dataset table and a destination attribute node representing the column of the source dataset table, wherein the one or more transformation nodes comprise the transformation node, and wherein the plurality of edges comprises a first edge representing the mapping between the origin attribute node and the attribute computation node, and a second edge representing the mapping between the attribute computation node and the destination attribute node.

4. The method of claim 3, wherein the generation of the lineage graph further comprises:

loading the computation node graph in a data lineage storage, wherein the loading comprises:

for the transformation node:

inheriting the origin attribute node and the destination attribute node from the plurality of attribute nodes in the computation node graph;

inheriting the one or more attribute computation nodes comprising the one or more statements; and generating a plurality of lineage edges based on the plurality of edges, wherein a first lineage edge of the plurality of lineage edges connects the origin attribute node with the attribute computation node and a second lineage edge of the plurality of lineage edges connects the attribute computation node with the destination attribute node; and generating the lineage graph based on the plurality of transformation nodes.

5. The method of claim 3, further comprising:

establishing a remote source connection between the DLS and the DSS;

based on credentials of the remote source connection, accessing the plurality of datasets and metadata of the plurality of datasets;

translating the plurality of source datasets into the plurality of source dataset tables;

obtaining the plurality of data objects from the plurality of source dataset tables;

storing the plurality of data objects and the plurality of source dataset tables at the DLS;

establishing a metadata connection between the DLS and the DSS; and based on credentials of the metadata connection, iteratively accessing the plurality of computation specifications.

6. The method of claim 5, wherein storing the plurality of source dataset tables at the DLS comprises:

merging a set of source dataset tables associated with the dataset, wherein the set of source dataset tables is provided by a lineage extractor of the DLS through a corresponding set of remote connections;

storing a merged source dataset table at the DLS, wherein the merged source dataset table corresponds to the source dataset;

relating the merged source dataset table to at least one source dataset table that is provided by a different lineage extractor of the DLS and comprises one or more components of the dataset; and creating a mediated table corresponding to the dataset.

7. The method of claim 1 further comprising:

providing the plurality of data objects at a user interface (UI) device; and receiving, through the UI device, a request from a user to provide data lineage information for the data object.

8. The method of claim 7 further comprising:

examining privileges of the user; and obfuscating at least one data object in a data lineage structure of the one or more data lineage structures, wherein the at least one data object is inaccessible for the user based on the privileges of the user.

9. A computer system to provide lineage information in a heterogeneous network, the system comprising:

a processor; and a memory in association with the processor storing instructions related to:

generating a dataset by applying one or more transformation operations to the dataset of a plurality of datasets stored at a data source system (DSS);

generating a plurality of lineage graphs corresponding to a plurality of data objects, wherein data at a data object of the plurality of data objects is included in a source dataset table of a plurality of source dataset tables stored at a data lineage server (DLS), and wherein the data object represents the dataset of the plurality of datasets;

determining, from the plurality of lineage graphs, a lineage graph corresponding to the dataset; and based on the lineage graph, generating one or more data lineage structures that define relationships between the data object and one or more data objects corresponding to one or more parent and child datasets of the dataset, wherein the one or more data lineage structures comprise data from the dataset and from the one or more parent and child datasets, wherein metadata defines how the dataset is computed from the parent dataset and how the child dataset is computed from the dataset.

10. The system of claim 9, wherein the lineage graph is generated to include a plurality of edges and a plurality of nodes, wherein the plurality of nodes comprises a node referring to the source dataset table, one or more nodes referring to one or more source dataset tables corresponding to the one or more datasets, and one or more transformation nodes referring one or more transformation operations applied to the one or more datasets to generate the dataset.

11. The system of claim 9, wherein generation of the lineage graph comprises:

accessing a computation specification of a plurality of computation specifications, wherein the computation specification is associated with the dataset at the DSS;

for a transformation operation identified in the computation specification:

identifying one or more statements in the transformation operation;

generating a transformation node corresponding to the transformation operation, wherein the transformation node comprises one or more attribute computation nodes, and wherein an attribute computation node of the one or more attribute computation nodes comprises a statement of the one or more statements; and creating a mapping between a column of an input source dataset table associated with a parent dataset of the one or more datasets, the attribute computation node, and the column of the source dataset table, wherein the column of the input source dataset table corresponds to a component of the parent dataset, and wherein the component of the dataset is computed by applying the statement on the component of the parent dataset; and for the computation specification, generating a computation node graph comprising a plurality of attribute nodes, one or more transformation nodes, and a plurality of edges, wherein the plurality of attribute nodes comprises an origin attribute node representing the column of the input source dataset table and a destination attribute node representing the column of the source dataset table, wherein the one or more transformation nodes comprise the transformation node, and wherein the plurality of edges comprises a first edge representing the mapping between the origin attribute node and the attribute computation node, and a second edge representing the mapping between the attribute computation node and the destination attribute node.

12. The system of claim 11, wherein the generation of the lineage graph further comprises:

loading the computation node graph in a data lineage storage, wherein the loading comprises:

for the transformation node:

inheriting the origin attribute node and the destination attribute node from the plurality of attribute nodes in the computation node graph;

inheriting the one or more attribute computation nodes comprising the one or more statements; and generating a plurality of lineage edges based on the plurality of edges, wherein a first lineage edge of the plurality of lineage edges connects the origin attribute node with the attribute computation node and a second lineage edge of the plurality of lineage edges connects the attribute computation node with the destination attribute node; and generating the lineage graph based on the plurality of transformation nodes.

13. The system of claim 11, wherein the instructions further comprising:

establishing a remote source connection between the DLS and the DSS;

based on credentials of the remote source connection, accessing the plurality of datasets and metadata of the plurality of datasets;

translating the plurality of source datasets into the plurality of source dataset tables;

obtaining the plurality of data objects from the plurality of source dataset tables;

storing the plurality of data objects and the plurality of source dataset tables at the DLS;

establishing a metadata connection between the DLS and the DSS; and based on credentials of the metadata connection, iteratively accessing the plurality of computation specifications.

14. The system of claim 13, wherein storing the plurality of source dataset tables at the DLS comprises:

merging a set of source dataset tables associated with the dataset, wherein the set of source dataset tables is provided by a lineage extractor of the DLS through a corresponding set of remote connections;

storing a merged source dataset table at the DLS, wherein the merged source dataset table corresponds to the source dataset;

relating the merged source dataset table to at least one source dataset table that is provided by a different lineage extractor of the DLS and comprises one or more components of the dataset; and creating a mediated table corresponding to the dataset.

15. The system of claim 9, wherein the instructions further comprising:

providing the plurality of data objects at a user interface (UI) device; and receiving, through the UI device, a request from a user to provide data lineage information for the data object.

16. The system of claim 15, wherein the instructions further comprising:

examining privileges of the user; and obfuscating at least one data object in a data lineage structure of the one or more data lineage structures, wherein the at least one data object is inaccessible for the user based on the privileges of the user.

17. A non-transitory computer readable medium storing instructions which when executed by at least processor cause a computer system to perform operations comprising:

generate a dataset by applying one or more transformation operations to the dataset of a plurality of datasets stored at a data source system (DSS);

generate a plurality of lineage graphs corresponding to a plurality of data objects, wherein data at a data object of the plurality of data objects is included in a source dataset table of a plurality of source dataset tables stored at a data lineage server (DLS), and wherein the data object represents the dataset of the plurality of datasets;

determine, from the plurality of lineage graphs, a lineage graph corresponding to the dataset; and based on the lineage graph, generate one or more data lineage structures that define relationships between the data object and one or more data objects corresponding to one or more parent and child datasets of the dataset, wherein the one or more data lineage structures comprise data from the dataset and from the one or more parent and child datasets, wherein metadata defines how the dataset is computed from the parent dataset and how the child dataset is computed from the dataset.

18. The computer readable medium of claim 17, wherein generation of the lineage graph comprises:

access a computation specification of a plurality of computation specifications, wherein the computation specification is associated with the dataset at the DSS;

for a transformation operation identified in the computation specification:

identify one or more statements in the transformation operation;

generate a transformation node corresponding to the transformation operation, wherein the transformation node comprises one or more attribute computation nodes, and wherein an attribute computation node of the one or more attribute computation nodes comprises a statement of the one or more statements; and create a mapping between a column of an input source dataset table associated with a parent dataset of the one or more datasets, the attribute computation node, and the column of the source dataset table, wherein the column of the input source dataset table corresponds to a component of the parent dataset, and wherein the component of the dataset is computed by applying the statement on the component of the parent dataset; and for the computation specification, generate a computation node graph comprising a plurality of attribute nodes, one or more transformation nodes, and a plurality of edges, wherein the plurality of attribute nodes comprises an origin attribute node representing the column of the input source dataset table and a destination attribute node representing the column of the source dataset table, wherein the one or more transformation nodes comprise the transformation node, and wherein the plurality of edges comprises a first edge representing the mapping between the origin attribute node and the attribute computation node, and a second edge representing the mapping between the attribute computation node and the destination attribute node.

19. The computer readable medium of claim 18, wherein the operations further comprising:
    establish a remote source connection between the DLS and the DSS;
    based on credentials of the remote source connection, access the plurality of datasets and metadata of the plurality of datasets;
    translate the plurality of source datasets into the plurality of source dataset tables;
    obtain the plurality of data objects from the plurality of source dataset tables;
    store the plurality of data objects and the plurality of source dataset tables at the DLS;
    establish a metadata connection between the DLS and the DSS; and
    based on credentials of the metadata connection, iteratively access the plurality of computation specifications.

20. The computer readable medium of claim 19, wherein storing the plurality of source dataset tables at the DLS comprises:
    merge a set of source dataset tables associated with the dataset, wherein the set of source dataset tables is provided by a lineage extractor of the DLS through a corresponding set of remote connections;
    store a merged source dataset table at the DLS, wherein the merged source dataset table corresponds to the source dataset;
    relate the merged source dataset table to at least one source dataset table that is provided by a different lineage extractor of the DLS and comprises one or more components of the dataset; and
    create a mediated table corresponding to the dataset.

* * * * *